United States Patent
Kawashima

(10) Patent No.: US 11,700,345 B2
(45) Date of Patent: Jul. 11, 2023

(54) IMAGE PROCESSING APPARATUS, IMAGE PROCESSING METHOD, AND STORAGE MEDIUM FOR DISPLAYING A FUNCTION SCREEN

(71) Applicant: CANON KABUSHIKI KAISHA, Tokyo (JP)

(72) Inventor: Yasuaki Kawashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/322,366

(22) Filed: May 17, 2021

(65) Prior Publication Data

US 2021/0368066 A1 Nov. 25, 2021

(30) Foreign Application Priority Data

May 22, 2020 (JP) .................................. 2020-090061

(51) Int. Cl.
*H04N 1/44* (2006.01)
(52) U.S. Cl.
CPC ......... *H04N 1/4426* (2013.01); *H04N 1/4413* (2013.01); *H04N 1/4433* (2013.01)
(58) Field of Classification Search
CPC combination set(s) only.
See application file for complete search history.

(56) References Cited

U.S. PATENT DOCUMENTS

| | | | | |
|---|---|---|---|---|
| 11,463,596 | B2* | 10/2022 | Mizuno | H04N 1/4433 |
| 2005/0152544 | A1* | 7/2005 | Kizawa | G07C 9/22 380/55 |
| 2007/0212027 | A1* | 9/2007 | Terao | H04N 1/4426 386/252 |
| 2015/0381839 | A1* | 12/2015 | Adachi | H04N 1/00225 358/474 |
| 2016/0092146 | A1* | 3/2016 | Adachi | G06F 3/1239 358/1.14 |
| 2016/0295033 | A1* | 10/2016 | Hirasawa | H04N 1/0097 |
| 2017/0264787 | A1* | 9/2017 | Ando | H04N 1/4433 |

FOREIGN PATENT DOCUMENTS

JP 2018-186517 A 11/2018

* cited by examiner

*Primary Examiner* — Barbara D Reinier
(74) *Attorney, Agent, or Firm* — Canon U.S.A., Inc. IP Division

(57) ABSTRACT

Provided is an image processing apparatus which includes a display, is able to read card information from a card, and provides at least any of a function using a scanner and a function using a printer, the image processing apparatus including: an execution unit configured to execute, if card information associated with a user account is detected, a login process to the image processing apparatus based on the user account; and a control unit configured to call, if the same card information is detected during a login state according to the login process, a shortcut corresponding to the card information in the login state, wherein, if the shortcut is called, a screen for a function associated with the shortcut is displayed on the display in a state in which a setting value group corresponding to the shortcut is applied.

7 Claims, 42 Drawing Sheets

IMAGE PROCESSING APPARATUS, IMAGE PROCESSING METHOD, AND STORAGE MEDIUM FOR DISPLAYING A FUNCTION SCREEN

BACKGROUND OF THE INVENTION

Field of the Invention

The present invention relates to an image processing apparatus, an image processing method, and a storage medium.

Description of the Related Art

In an image processing apparatus such as an MFP, managing card information (for example, a manufacturing number) of any IC card in association with a function (application) of the image processing apparatus and a combination (shortcut) of a plurality of setting values related to the function is considered. "MFP" is an abbreviation for "multifunction peripheral." In such a case, Japanese Patent Laid-Open No. 2018-186517 discloses that a shortcut which is associated with card information can be easily called by reading an IC card with an MFP.

However, since the past, there has also been a function of authenticating (logging in to) an image processing apparatus using an IC card. Therefore, if this authentication function is made valid, a function of calling a shortcut using an IC card cannot be executed, which leads to a problem of a decrease in functionality.

SUMMARY OF THE INVENTION

An object of the present invention is to provide an image processing apparatus having an improvement in a process of reading and executing card information from a card.

According to an embodiment of the present invention, an image processing apparatus which includes a display, is able to read card information from a card, and provides at least any of a function using a scanner and a function using a printer, the image processing apparatus comprising: a memory storing instructions; and a processor executing the instructions causing the image processing apparatus to execute, if card information associated with a user account is detected, a login process to the image processing apparatus based on the user account, call, if the same card information is detected during a login state according to the login process, a shortcut corresponding to the card information in the login state, and display, if the shortcut is called, a screen for a function associated with the shortcut on the display in a state in which a setting value group corresponding to the shortcut is applied.

Further features of the present invention will become apparent from the following description of exemplary embodiments (with reference to the attached drawings).

DESCRIPTION OF THE EMBODIMENTS

Hereinafter, a mode for carrying out the present invention will be described with reference to the accompanying drawings.

First Embodiment

Figure 1:
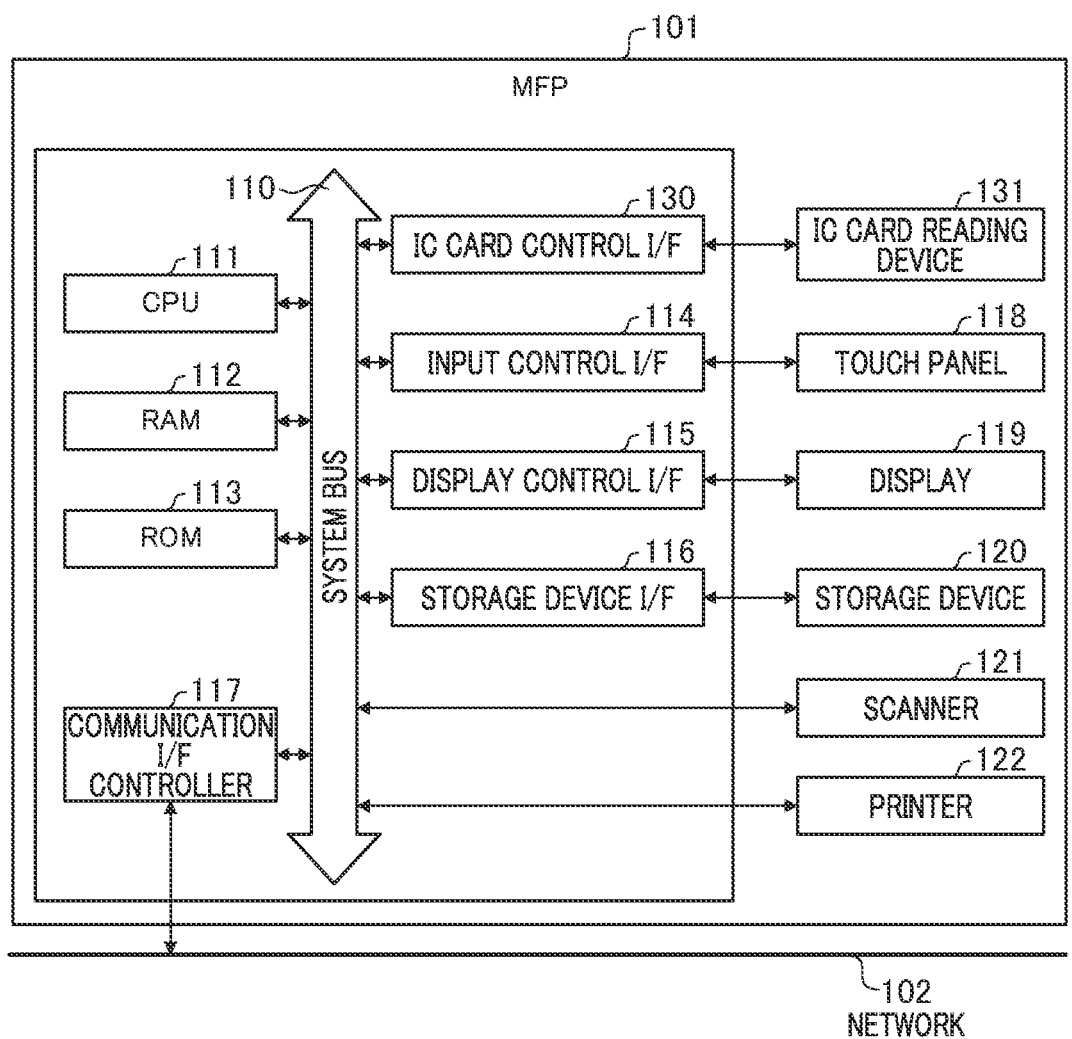
FIG. 1 is a diagram illustrating a controller unit of an MFP according to an embodiment of the present invention.

FIG. 1 is a diagram illustrating an example of a hardware configuration of a multifunction peripheral (MFP) 101. FIG. 1 shows an example for the purpose of description in the present embodiment, and it goes without saying that any other configuration may be used insofar as it includes other components or has the same effect as the present embodiment. The MFP 101 is an example of an image processing apparatus.

The MFP 101 includes a system bus 110, a CPU 111, a RAM 112, a ROM 113, an input control I/F 114, a display control I/F 115, a storage device I/F 116, a communication I/F controller 117, and an IC card control I/F 130. "CPU" is an abbreviation for "central processing unit." "RAM" is an abbreviation for "random access memory." "ROM" is an abbreviation for "read only memory." "I/F" is an abbreviation for "interface."

The CPU 111, the RAM 112, the ROM 113, the input control IF 114, the display control I/F 115, the storage device I/F 116, the communication I/F controller 117, and the IC card control I/F 130 are each connected to the system bus 110. In addition, a scanner 121 and a printer 122 are also each connected to the system bus 110. The units connected to the system bus 110 are configured to be capable of exchanging data with each other through the system bus 110.

The CPU 111 is a device that controls each device or calculates and processes data. The RAM 112 is a volatile memory, and is used as a temporary storage area such as a main memory or a work area of the CPU 111. The ROM 113 is a non-volatile memory, and is configured with image data, other data, various programs for the CPU 111 to operate, and the like stored in predetermined areas. The CPU 111 controls each unit of the MFP 101 using the RAM 112 as a work memory, for example, in accordance with programs stored in the ROM 113. Meanwhile, the programs for the CPU 111 to operate are not limited to being stored in the ROM 113, and may be stored in a storage device 120.

The input control I/F 114 accepts a user's operation, generates a control signal according to the operation, and supplies the generated signal to the CPU 111. For example, the input control I/F 114 is connected, as an input device that accepts the user's operation, to a character information input device such as a keyboard (not shown), a hard key for directly inputting a numerical value or the like, a pointing device such as a touch panel 118, or the like. Meanwhile, the touch panel 118 is, for example, an input device that outputs coordinate information according to a position in contact with an input unit configured in a plane. Hereinafter, in the present embodiment, an operation using a touch panel is described, but it goes without saying that there is no limitation thereto. The CPU 111 controls each unit of the MFP 101 in accordance with a program on the basis of a control signal which is generated and supplied by the input control I/F 114 in response to the user's operation performed on an input device. This makes it possible to cause the MFP 101 to perform an action according to the user's operation.

The display control I/F 115 outputs a display signal for displaying an image on a display 119. For example, the CPU 111 supplies the generated display control signal to the display control I/F 115 in accordance with a program. The display control I/F 115 generates a display signal on the basis of this display control signal to output the generated signal to the display 119. For example, the display control I/F 115 displays a GUI screen constituting a graphical user interface (GUI) on the display 119 on the basis of the display control signal generated by the CPU 111. In addition, the touch panel 118 may be formed integrally with the display 119. For example, the touch panel 118 is configured so that its light transmittance does not interfere with display of the display 119, and is attached to the upper layer of the display surface of the display 119. Input coordinates on the touch panel 118 and display coordinates on the display 119 are associated with each other. This makes it possible to configure a GUI as if a user could directly operate a screen displayed on the display 119. In the following description, the touch panel 118 is assumed to be formed integrally with the display 119.

The storage device 120 such as, for example, a hard disk drive (HDD) or a flash memory is connected to the storage device I/F 116. Reading of data from the storage device 120 and writing of data to the storage device 120 are performed on the basis of control of the CPU 111. The storage device 120 may be used instead of the RAM 112 or the ROM 113.

The communication I/F controller 117 performs communication with various networks such as, for example, a LAN, the Internet, a wired line, or a wireless line on the basis of control of the CPU 111. Various devices such as a PC, another MFP, a printer, or a server are connected to a network 102 so as to be capable of communicating with the MFP 101. In addition, connection to an external authentication server to be described later is also performed through the communication I/F controller 117.

The scanner 121 reads a manuscript and generates image data on the basis of control of the CPU 111. For example, the CPU 111 causes the scanner 121 to perform a scan process according to a user's instruction which is input through the input control I/F 114. The scanner 121 reads a manuscript placed on a manuscript stand or an auto document feeder (ADF), converts it into digital data, and generates image data. The scanner 121 stores the generated image data in the storage device 120 through the storage device I/F 116.

The printer 122 prints the image data saved in the storage device 120 on the basis of control of the CPU 111. For example, the CPU 111 causes the printer 122 to perform a print process according to a user's instruction which is input through the input control I/F 114 or a command instruction which is input from an external device through the communication I/F controller 117. The printer 122 reads the image data from the storage device 120, converts the read data into a printable data format, and prints it on a paper manuscript.

The IC card control I/F 130 outputs a reading instruction signal of an IC card to an IC card reading device 131. Here, the IC card in the present embodiment represents a non-contact IC card equipped with near field communication (NFC) or the like. For example, the CPU 111 supplies a generated IC card control signal to the IC card control I/F 130 in accordance with a program. The IC card control I/F 130 generates an IC card reading signal on the basis of this control signal and outputs the generated signal to the IC card reading device 131. The IC card reading device 131 reads information of the touched IC card, and outputs a signal of a reading result to the IC card control I/F 130. The information of the IC card which is read by the IC card reading device 131 is an example of card information. In addition, the IC card is an example of a card.

Figure 2:
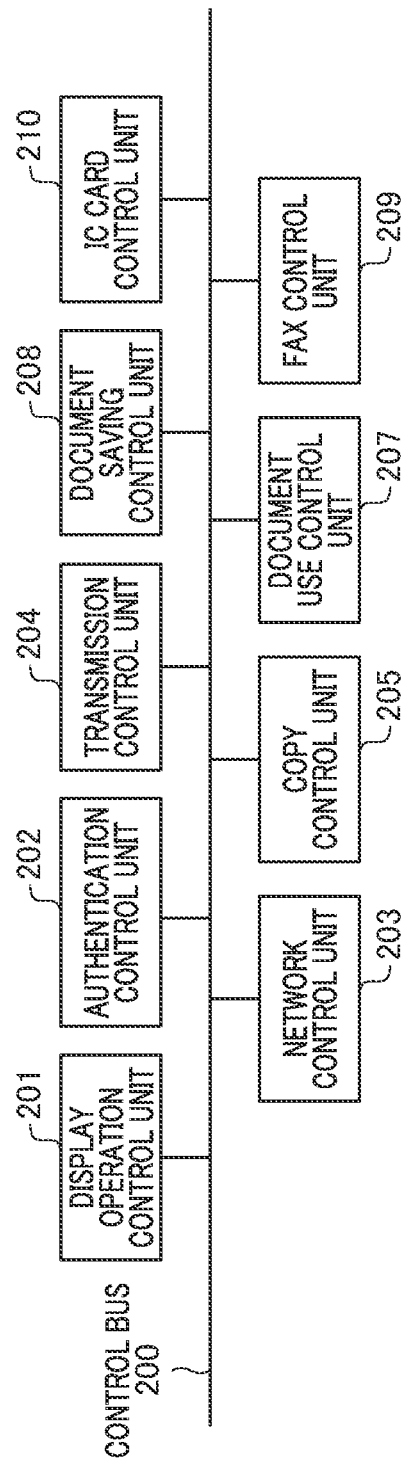
FIG. 2 is a diagram illustrating a program configuration of the MFP according to the embodiment of the present invention.

Next, the configuration of software of the MFP 101 in the present embodiment will be described with reference to FIG. 2. Meanwhile, FIG. 2 shows an example for the purpose of description in the present embodiment, and it goes without saying that other components may be included or a configuration with the same effect as the present embodiment may be used. Each control unit in FIG. 2 is realized by developing software stored in the ROM 113 into the RAM 112 as necessary such as in startup or in function use, and executing it by the CPU 111.

The MFP 101 includes a control bus 200, a display operation control unit 201, an authentication control unit 202, a network control unit 203, a transmission control unit 204, a copy control unit 205, a document use control unit 207, a document saving control unit 208, a FAX control unit 209, and an IC card control unit 210. "FAX" is an abbreviation for "facsimile." The MFP 101 provides at least any of a function using a scanner and a function using a printer.

The display operation control unit 201, the authentication control unit 202, the network control unit 203, the transmission control unit 204, the copy control unit 205, the document use control unit 207, the document saving control unit 208, the FAX control unit 209, and the IC card control unit 210 are each connected to the control bus 200. The control bus 200 delivers information between the control units on the basis of control of the CPU 111. The hardware configuration of FIG. 1 and the software configuration of FIG. 2 realize various functions of the MFP 101 in cooperation. For example, the control bus 200 accepts instruction information which is input by a user from the display operation control unit 201, and temporarily saves it in the RAM 112. In addition, display information from each control unit is accepted through the control bus 200, and is displayed on the display 119. The network control unit 203 uses the communication I/F controller 117 to perform a process for connection to an external device on the network 102.

In addition, the MFP 101 has one or more functions such as copying and scanning, and includes a control unit for each of the functions. FIG. 2 shows, as an example, the transmission control unit 204, the copy control unit 205, the document use control unit 207, the document saving control unit 208, and the FAX control unit 209. There are naturally functions related to processing of the MFP 101 other than the functions shown in FIG. 2, and it goes without saying that there may be a control unit thereof.

The display operation control unit 201 controls the input control I/F 114 or the display control I/F 115 on the basis of control of the CPU 111. For example, the display operation control unit 201 performs display on the display 119 through the display control I/F 115 on the basis of an instruction from another control unit, or acquires information which is input by a user to the touch panel 118 through the input control IF 114. Meanwhile, the display operation control unit 201 notifies each control unit, as necessary, of the acquired information through the control bus 200. In the following description, when information or data is delivered between the control units, it is assumed that it goes through the control bus 200.

The authentication control unit 202 performs an authentication process for identifying a user on the basis of control of the CPU 111, and determines whether an operator of the MFP 101 is a legitimate user of the MFP 101. Performing an authentication process and starting a session in the case of a legitimate user is referred to as login. In addition, the authentication control unit 202 controls a user information database (not shown) having user information on the storage device 120 stored therein. In the MFP 101, not only the user information database inside the MFP 101 but also the authentication control unit 202 may be connected to an external authentication server through the communication I/F controller 117 and use the authentication result of the external authentication server. Exchange of authentication information with the external authentication server is performed using a known technique. In addition, a user using the MFP 101 and then ending a session of the user is referred to as logout.

The transmission control unit 204 scans a manuscript from the scanner 121, and converts the scanned document into a predetermined file format. The MFP 101 uses a protocol such as mail to transmit a document to a mail server or the like on the network 102 through the network control unit 203. As an example of using the transmission control unit 204, there is a "scan and send application."

The copy control unit 205 scans a manuscript from the scanner 121, performs designated processing such as stapling, and outputs it to the printer 122. As an example of using the copy control unit 205, there is a "copy application."

The document use control unit 207 prints or previews a document saved in an external file server, an HDD in the MFP 101, a memory medium, a cloud storage, or the like with the MFP 101. If a document on the HDD of the MFP 101 or a memory medium is used, the MFP 101 accesses the storage device 120 through the storage device I/F 116 to acquire and process a designated document. In the case of an external file server or a storage on a cloud, the MFP 101 uses an appropriate protocol to acquire a document at a saving destination on the network 102 through the network control unit 203. For example, if printing is performed, the MFP 101 outputs the acquired document with the printer 122. As an example of using the document use control unit 207, there is a "print application."

Similarly to the transmission control unit 204, the document saving control unit 208 scans a manuscript from the scanner 121, and converts the scanned document into a predetermined file format. The MFP 101 uses a communication protocol such as an SMB to save a document file in a file server on the network 102 through the network control unit 203. The MFP 101 can save a document file not only in a file server but also in an HDD inside the MFP 101, a memory medium such as a USB memory, and a storage on a cloud. In the case of the HDD of the MFP 101 or a memory medium, the MFP 101 accesses the storage device 120 through the storage device I/F 116 to save a document. In the case of an external file server or a storage on a cloud, the MFP 101 uses an appropriate protocol to save a document in a saving destination on the network 102 through the network control unit 203. As examples of using the document use control unit 207 and the document saving control unit 208, there are a "scan and save application" and a "cloud application," respectively.

The FAX control unit 209 scans a manuscript from the scanner 121, and converts the scanned document into an image format. The MFP 101 uses a FAX transmission protocol such as known G3 using a public network, an Internet line, or the like to transmit a document to a transmission destination through the network control unit 203. As an example of using the FAX control unit 209, there is a "fax application."

Setting values for the applications when the "scan and send application," the "copy application," the "print application," the "scan and save application," the "cloud application," and the "fax application" are executed can be registered as shortcuts. The MFP 101 saves information acquired by the display operation control unit 201 in the storage device 120.

The IC card control unit 210 accesses the IC card reading device 131 through the IC card control I/F 130, reads information of an IC card, and returns the read result to the control unit which is a request source.

A shortcut in the present embodiment does not depend on user information of a logged-in user or the like, and can be registered in association with card information. For example, a user may hold any card such as a transportation IC card in addition to an IC card used to log in to the MFP 101. In that case, the user registers a shortcut in association with card information of the transportation IC card, and thus can easily call the shortcut without logging in. In this case, there is no need to further register user information in association with the shortcut. Meanwhile, regarding card information of an IC card used to log in to the MFP 101, registration of card information can also be restricted when the card information is registered in association with the shortcut, when it is registered by importing the shortcut, or the like. A user who is logged in to the MFP 101 is identified by a user account.

Figure 3:
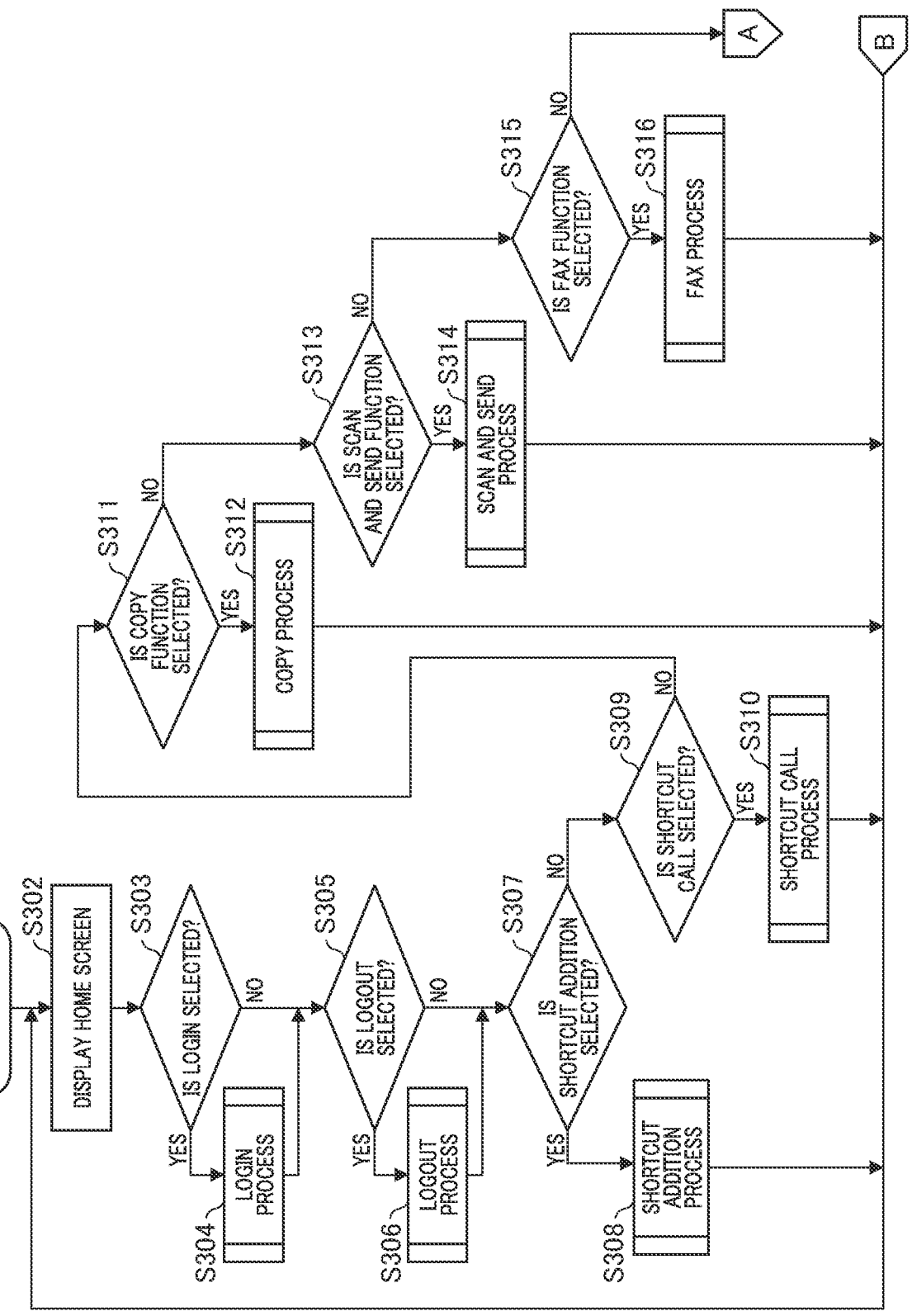
FIG. 3 is a flowchart illustrating an example of the embodiment of the present invention.
Figure 4:
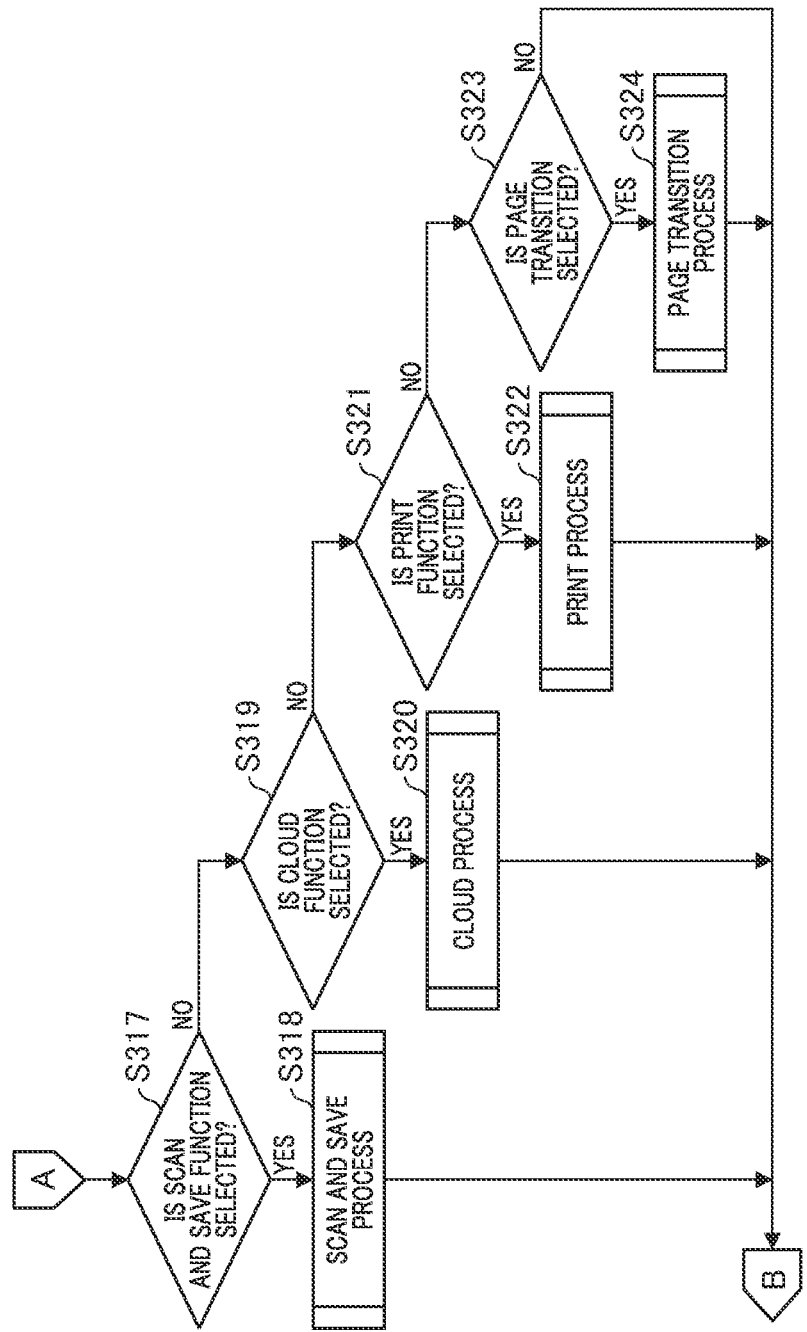
FIG. 4 is a flowchart illustrating an example of the embodiment of the present invention.

The processing of the MFP 101 in the present embodiment will be described with reference to FIGS. 3 and 4. A program for executing processes shown in the flowcharts of FIGS. 3 and 4 is stored in a ROM 113 or the storage device 120. When power is supplied, the MFP 101 develops a program read out from the storage device 120 through the ROM 113 or the storage device I/F 116 into the RAM 112 and executes the program by the CPU 111, and the processing of the flowcharts of FIGS. 3 and 4 is started.

Figure 5:
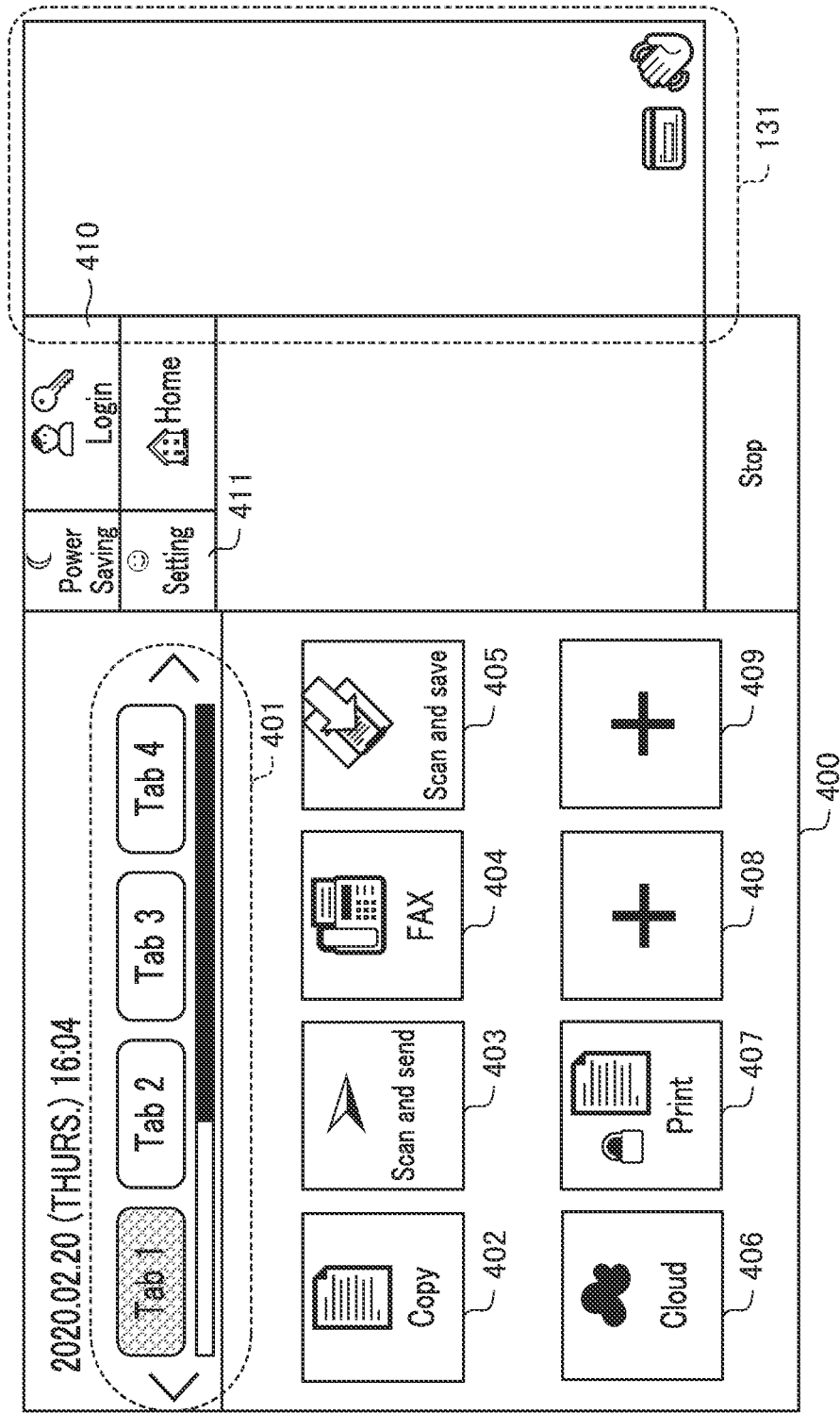
FIG. 5 is a diagram illustrating an example of a home screen in the embodiment of the present invention.

If the processing is started (S301), the display operation control unit 201 displays a home screen 400 shown in FIG. 5 as an example on the display 119 (S302). The home screen 400 has a plurality of screens. The display operation control unit 201 switches screens to be displayed by accepting the pressing of tabs displayed in a tab display area 401.

An icon 402 displayed in the home screen 400 is an icon that calls the above-described "copy application." An icon 403 displayed on the home screen 400 is an icon that calls the above-described "scan and send application." An icon 404 displayed on the home screen 400 is an icon that calls the above-described "fax application." An icon 405 displayed on the home screen 400 is an icon that calls the above-described "scan and save application." An icon 406 displayed on the home screen 400 is an icon that calls the above-described "cloud application." An icon 407 displayed on the home screen 400 is an icon that calls the above-described "print application."

An icon 408 and an icon 409 are icons for adding a shortcut. The MFP 101 accepts an operator's operation, and adds a shortcut to the icon 408 or the icon 409. If a shortcut is added, the MFP 101 registers the shortcut at the location of the icon 408 or the icon 409. The addition of a shortcut is an example of creating a shortcut.

The IC card reading device 131 is connected to the display 119 and is provided on the right side of the home screen 400. An operator presses a login button 410 or touches an IC card for login to the IC card reading device 131 (S303), so that the MFP 101 calls a login process performed by the authentication control unit 202 (S304). The login process will be described later.

Figure 6:
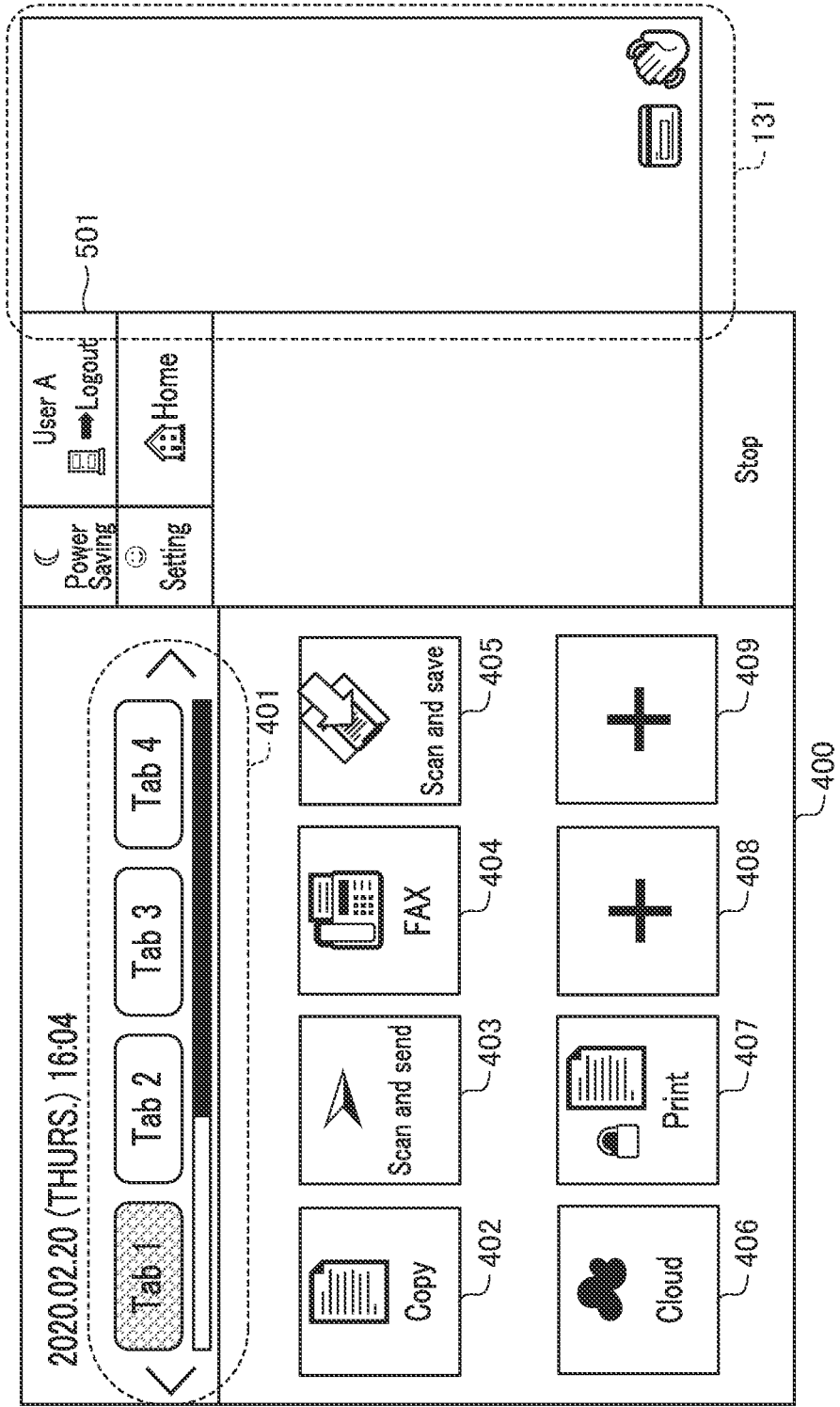
FIG. 6 is a diagram illustrating an example of a home screen after login in the embodiment of the present invention.

If a login is successful, the MFP 101 updates the home screen 400 shown in FIG. 6 as an example, and changes the login button 410 to a logout button 501. In this case, the MFP 101 displays a user name of a logged-in user on the logout button 501.

The MFP 101 calls a logout process (S306) performed by the authentication control unit 202 by a logout being selected (S305) in a state in which the login process is successful in S304. The selection of a logout involves, for example, accepting touching of an IC card for login associated with a user different from the logged-in user to the IC card reading device 131. In addition, the selection of a logout involves, for example, accepting the pressing of the logout button 501. The logout process will be described later. In the case of a logout, the MFP 101 returns to display of the home screen 400 shown in FIG. 5 as an example.

Next, if the icon 409 is pressed and an instruction for the addition of a shortcut is issued (S307), the MFP 101 executes a shortcut addition process (S308), and returns to display of the home screen 400 (S302). Hereinafter, the details of the shortcut addition process of S308 will be described with reference to the flowcharts of FIGS. 7 and 8.

Figure 7:
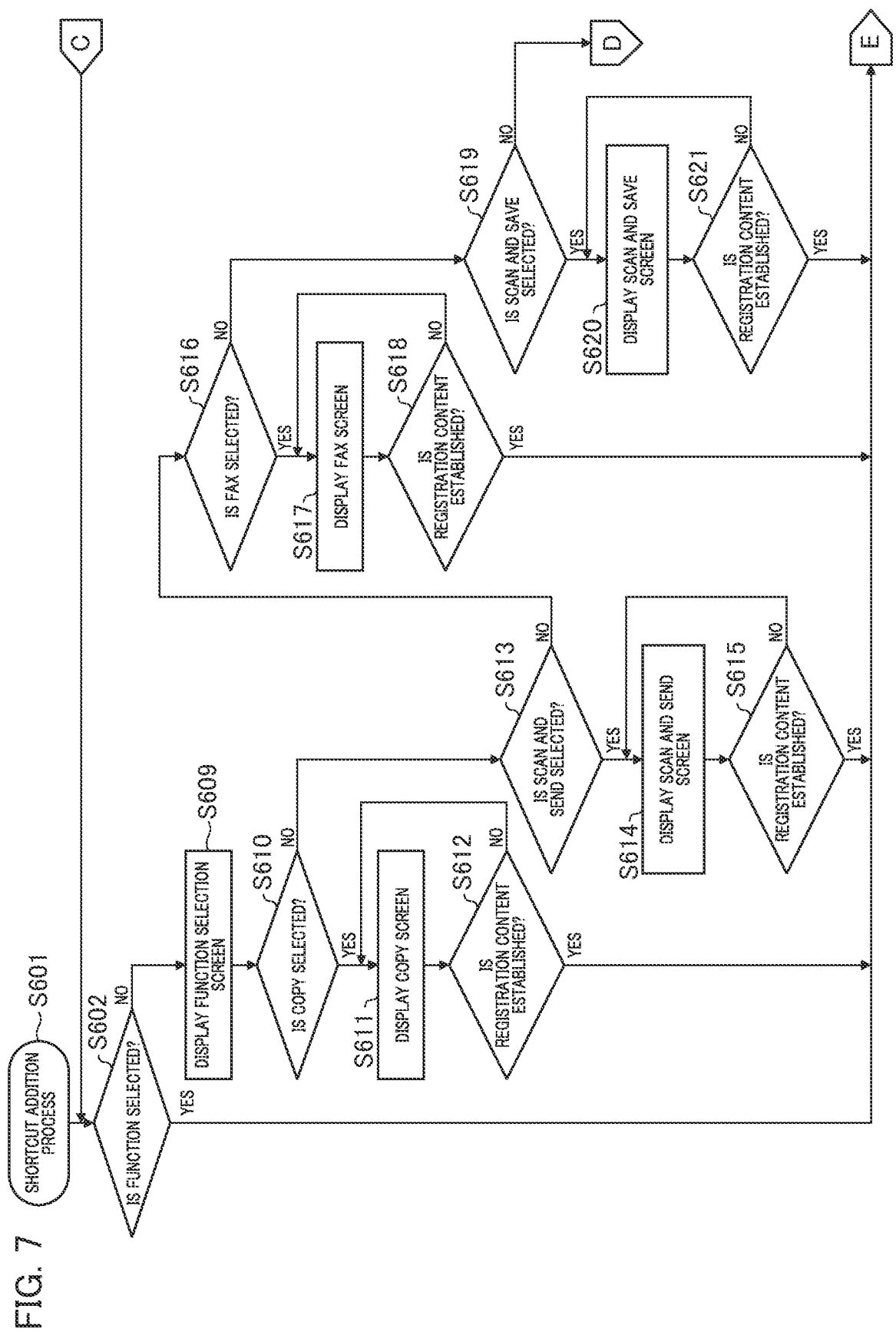
FIG. 7 is a flowchart illustrating an example of a shortcut addition process in the embodiment of the present invention.
Figure 8:
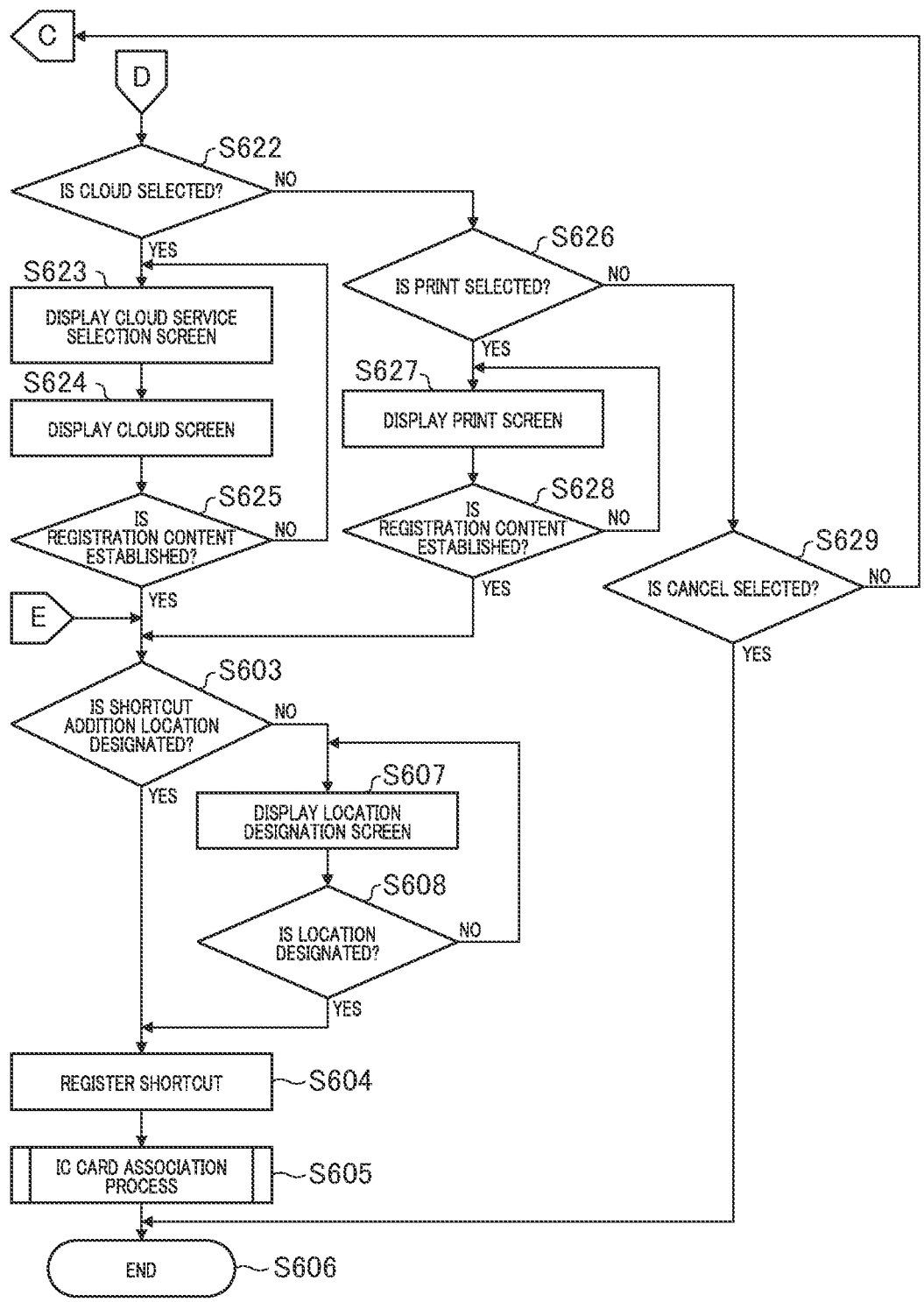
FIG. 8 is a flowchart illustrating an example of the shortcut addition process in the embodiment of the present invention.
Figure 9:
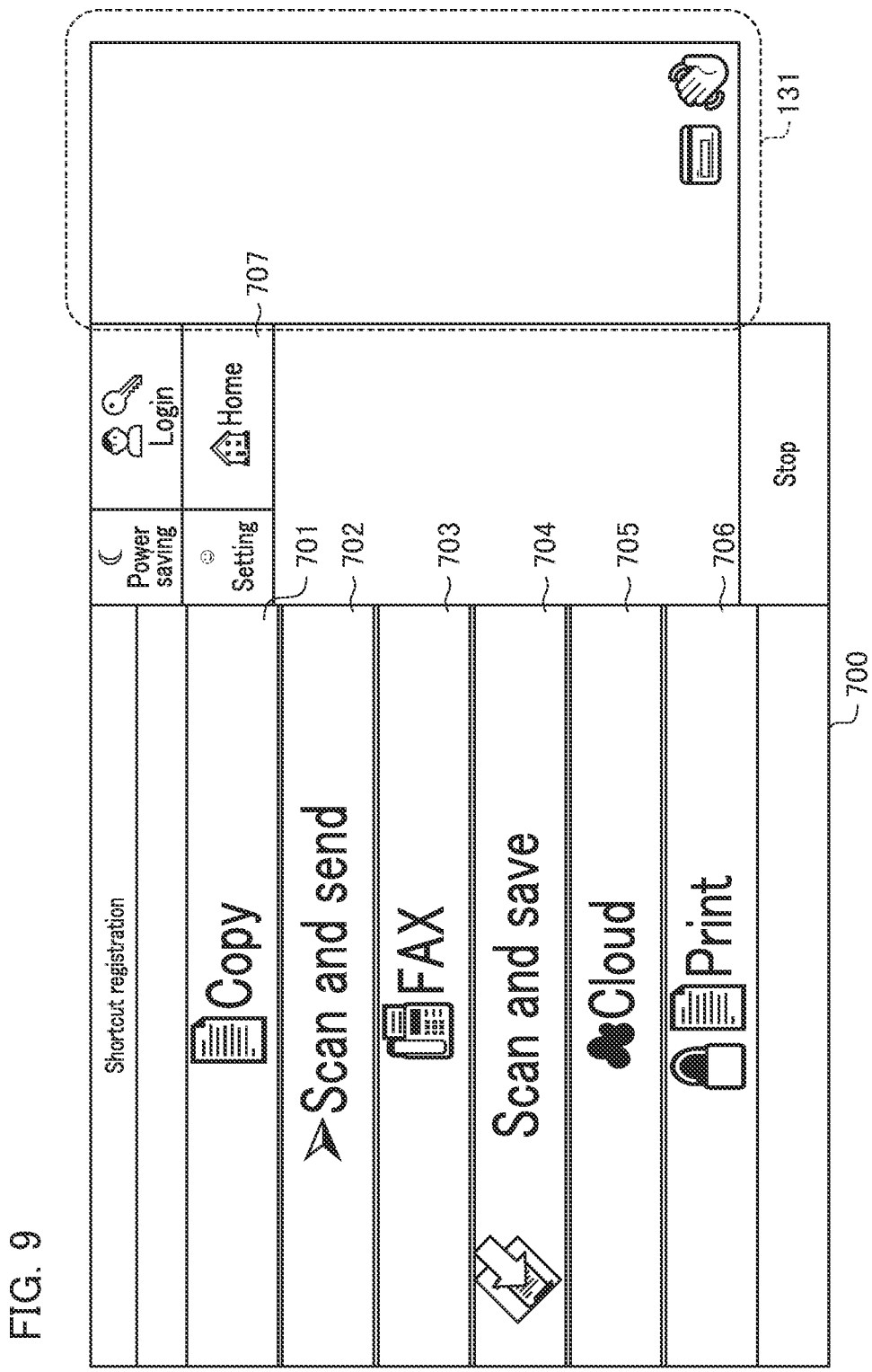
FIG. 9 is a diagram illustrating an example of a function selection screen in the embodiment of the present invention.

FIGS. 7 and 8 are flowcharts of the shortcut addition process. If the shortcut addition process is started (S601), the MFP 101 confirms whether a function to be registered as a shortcut is selected (S602). For example, the function to be registered as a shortcut is not selected for the icon 409. Therefore, if the MFP 101 accepts the pressing of the icon 409, the display operation control unit 201 displays a function selection screen 700, shown in FIG. 9 as an example, for selecting a function to be registered as a shortcut on the display 119 (S609). If the shortcut addition process is executed in other procedures to be described later, the function to be registered as a shortcut has been selected. In that case, the MFP 101 advances another process (S603).

Function selection buttons 701, 702, 703, 704, 705 and 706 for selecting functions are displayed on the function selection screen 700. The function selection buttons 701, 702, 703, 704, 705 and 706 correspond to the "copy application," the "scan and send application," the "fax application," the "scan and save application," the "cloud application," and the "print application," respectively. Each of the applications is an example of a function to be registered as a shortcut. A shortcut is registered including parameters used by each application. The parameters used by each application registered in a shortcut are an example of a setting value group corresponding to the shortcut.

Figure 10:
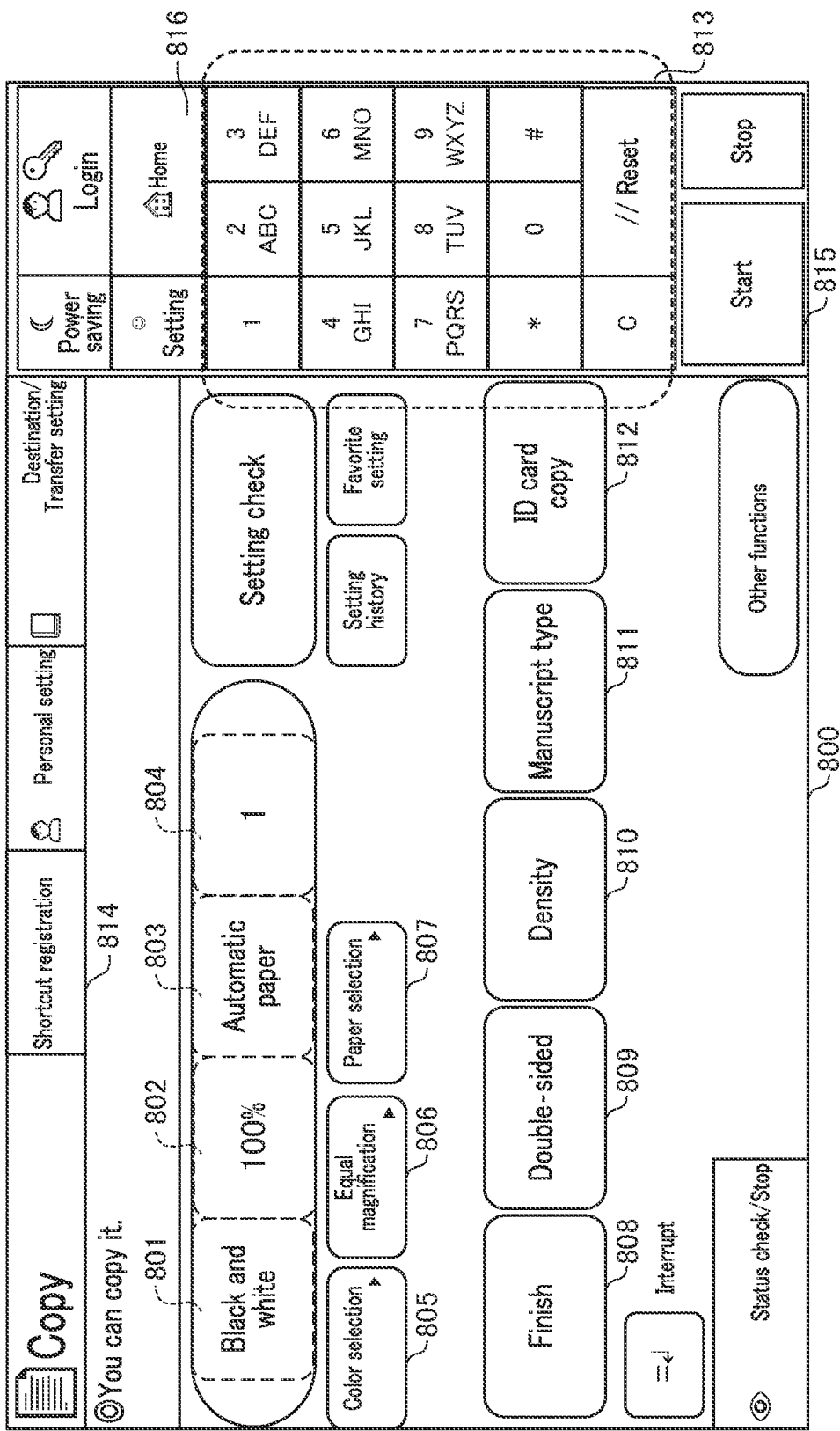
FIG. 10 is a diagram illustrating an example of a copy screen in the embodiment of the present invention.

If the function selection button 701 is pressed on the function selection screen 700 and the "copy application" is selected (S610), the display operation control unit 201 displays a copy screen 800 shown in FIG. 10 as an example on the display 119 (S611). The MFP 101 accepts setting of parameters used by the "copy application" on the copy screen 800.

On the copy screen 800, the parameters used by the "copy application" can be set with buttons 805, 806 and 807. The buttons 805 to 807 correspond to a color mode during printing, a magnification during printing, and the size of paper to be printed, respectively. The MFP 101 displays the parameters set with the buttons 805 to 807 in display fields 801 to 803. An operator can confirm the parameters set by display of the display fields 801 to 803.

On the copy screen 800, the number of copies to be printed can be set with a soft numeric keypad 813. The MFP 101 displays the number of print copies set with the soft numeric keypad 813 in a display field 804. The operator can confirm the set number of print copies in the display field 804.

On the copy screen 800, the parameters used by the "copy application" can be set with buttons 808, 809, 810, 811 and 812. The buttons 808 to 812 correspond to print finish setting, double-sided printing, density during printing, the type of manuscript, and ID card copy, respectively. The MFP 101 displays the parameters set with the buttons 808 to 812 on the buttons 808 to 812. The operator can confirm the parameters set by display of the buttons 808 to 812.

The operator finishes inputting the parameters of the "copy application" to be registered, and presses a shortcut register button 814 on the copy screen 800. If the pressing of the shortcut register button 814 is detected (S612), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes an IC card association process (S605), and then ends the shortcut addition process.

Figure 11:
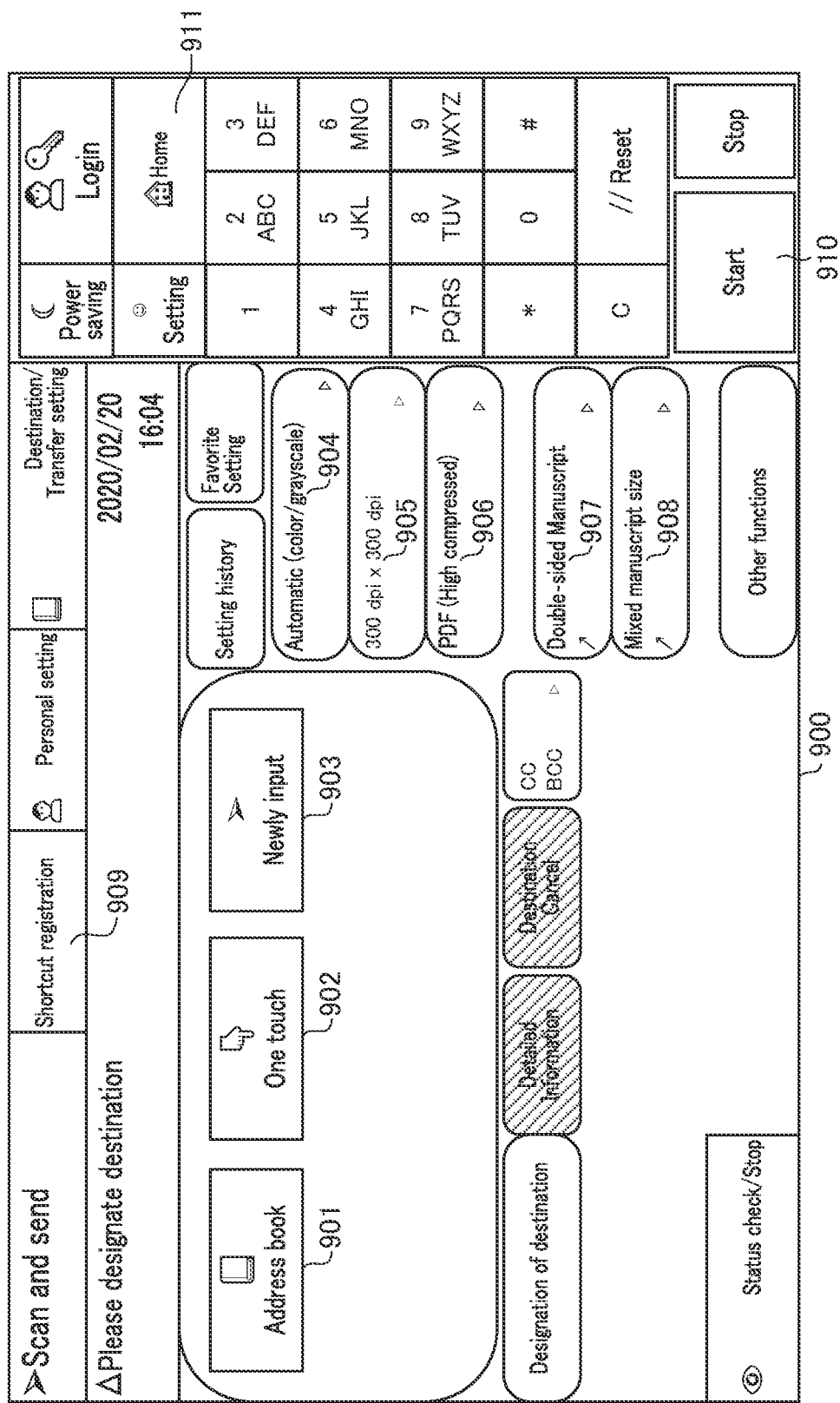
FIG. 11 is a diagram illustrating an example of a scan and send screen in the embodiment of the present invention.

Next, if the function selection button 702 is pressed on the function selection screen 700 and the "scan and send application" is selected (S613), the display operation control unit 201 displays a scan and send screen 90 shown in FIG. 11 as an example on the display 119 (S614).

On the scan and send screen 900, a destination of transmission performed by the "scan and send application" can be designated by pressing an address book button 901, a one-touch button 902, or a newly input button 903. These can be set by acquiring a destination from an address book, acquiring a destination in one-touch address book, or newly inputting destination information by a user. Since a method of setting a destination is a known technique, the description thereof will not be given.

In addition, on the scan and send screen 900, the parameters used by the "scan and send application" can be set with buttons 904, 905, 906, 907 and 908. The buttons 904 to 908 correspond to a color mode, reading resolution, a file format to be sent, double-sided scanning, and mixed manuscript size, respectively. The MFP 101 displays the parameters set with the buttons 904 to 908 on the buttons 904 to 908. The operator can confirm the parameters set by display of the buttons 904 to 908.

The operator finishes inputting the parameters of the "scan and send application" to be registered, and presses a shortcut register button 909 on the scan and send screen 900. If the pressing of the shortcut register button 909 is detected (S615), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes the IC card association process (S605), and then ends the shortcut addition process.

Figure 12:
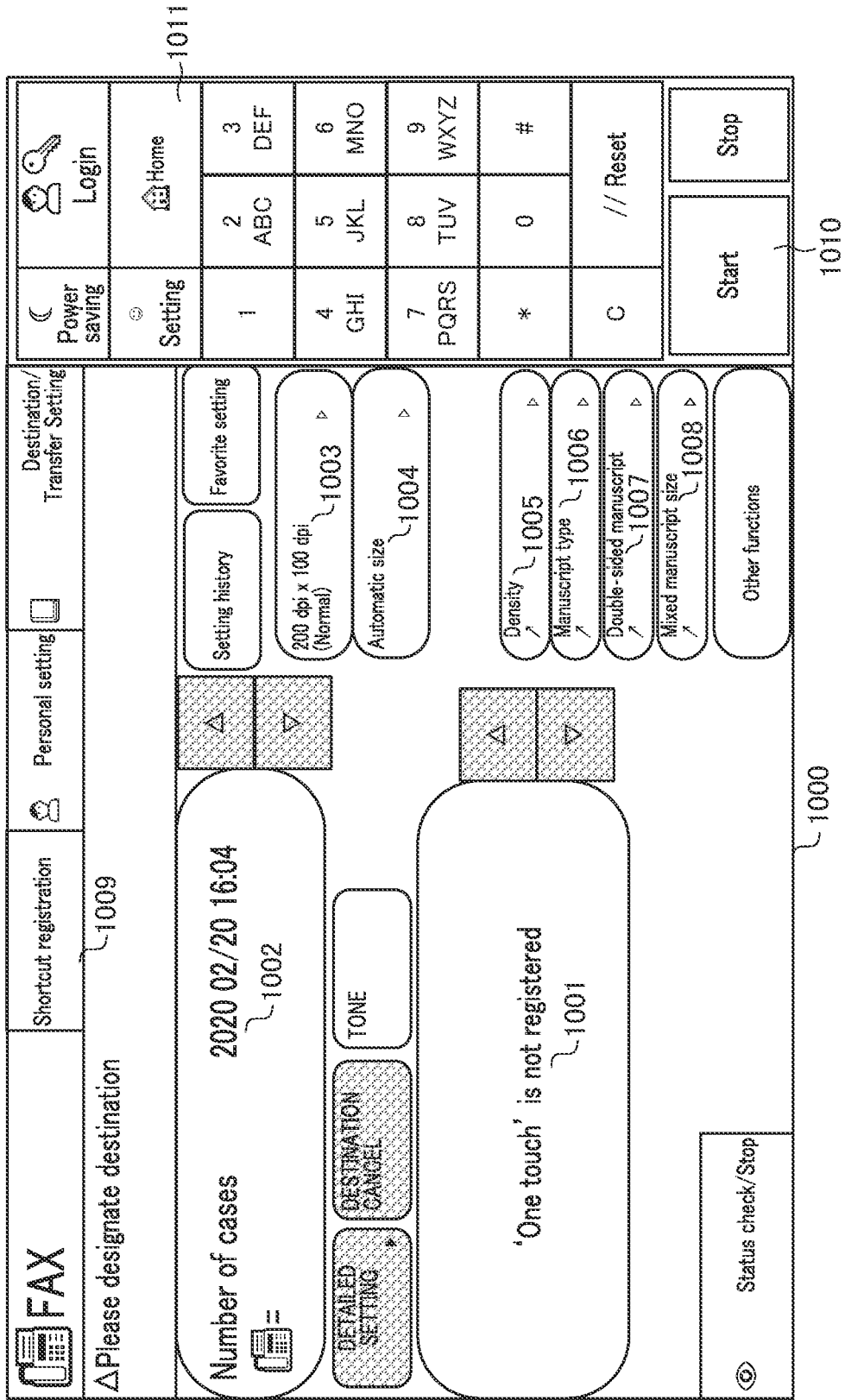
FIG. 12 is a diagram illustrating an example of a fax screen in the embodiment of the present invention.

Next, if the function selection button 703 is pressed on the function selection screen 700 and the "fax application" is selected (S616), the display operation control unit 201 displays a fax screen 1000 shown in FIG. 12 as an example on the display 119 (S617).

On the fax screen 1000, a destination of transmission performed by the "fax application" can be designated by pressing any of one-touch buttons displayed on a one-touch button display area 1001. The designated destination is displayed in a transmission destination display field 1002 together with the number of designated destinations.

In addition, the parameters used by the "fax application" can be set with buttons 1003, 1004, 1005, 1006, 1007 and 1008. The buttons 1003 to 1008 correspond to reading resolution, manuscript size, density, the type of manuscript, double-sided scanning, and mixed manuscript size, respectively. The MFP 101 displays the parameters set with the buttons 1003 to 1008 on the buttons 1003 to 1008. The operator can confirm the parameters set by display of the buttons 1003 to 1008.

The operator finishes inputting the parameters of the "fax application" to be registered, and presses a shortcut register button 1009 on the fax screen 1000. If the pressing of the shortcut register button 1009 is detected (S618), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes the IC card association process (S605), and then ends the shortcut addition process.

Figure 13:
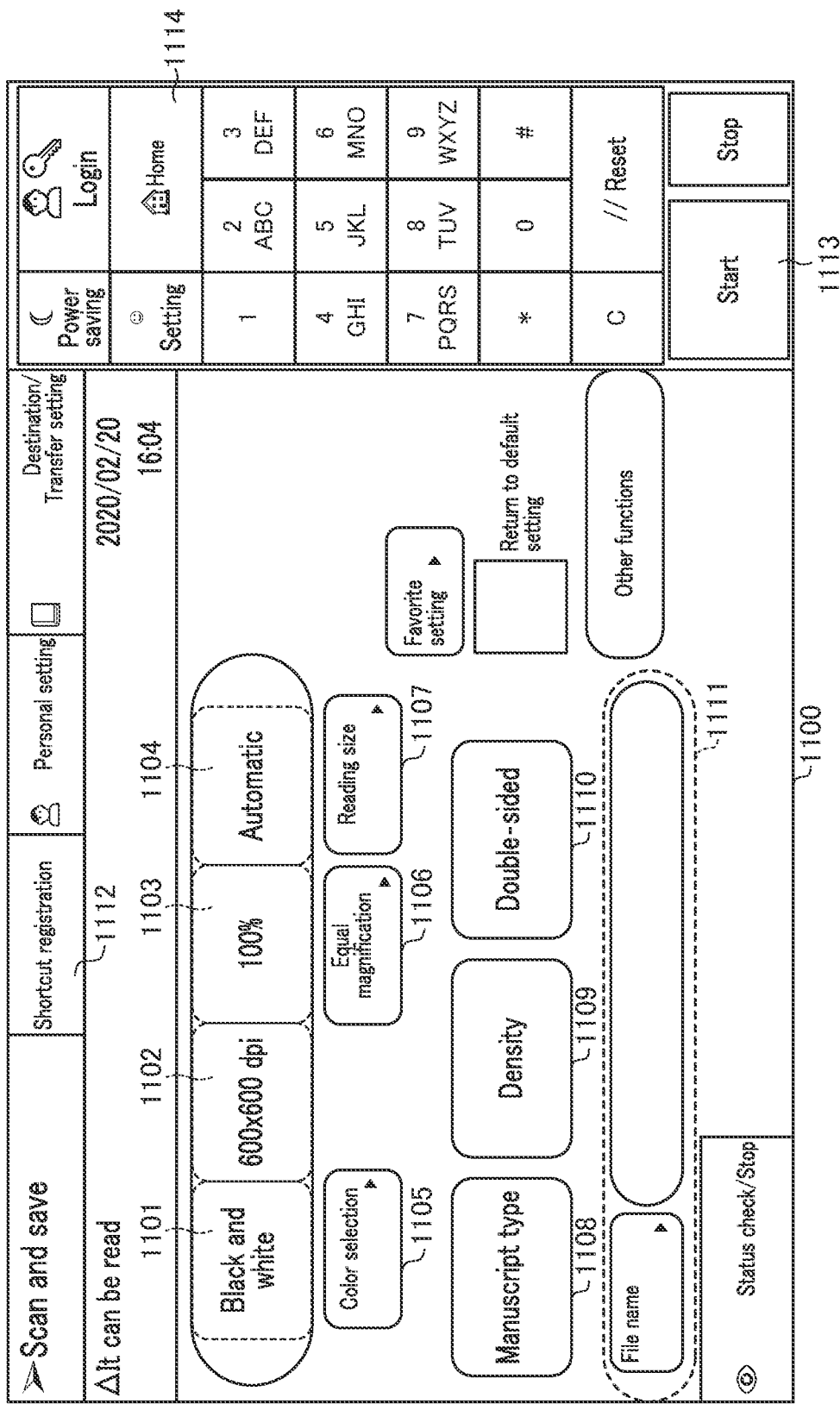
FIG. 13 is a diagram illustrating an example of a scan and save screen in the embodiment of the present invention.

Next, if the function selection button 704 is pressed on the function selection screen 700 and the "scan and save application" is selected (S619), the display operation control unit 201 displays a scan and save screen 1100 shown in FIG. 13 as an example on the display 119 (S620).

On the scan and save screen 1100, the parameters used by the "scan and save application" can be set with buttons 1105, 1106 and 1107. The buttons 1105 to 1107 correspond to a color mode, a magnification, and manuscript size, respectively. The MFP 101 displays the parameters set with the buttons 1105 to 1107 in display fields 1101, 1103 and 1104. The operator can confirm the parameters set by display of the display fields 1101, 1103 and 1104. Meanwhile, in the present example, the resolution is fixed and is displayed in a display field 1102, but the resolution may also be capable of being set with a parameter button.

In addition, on the scan and save screen 1100, the parameters used by the "scan and save application" can be set with buttons 1108, 1109, 1110 and 1111. The buttons 1108 to 1111 correspond to the type of manuscript, density, double-sided scanning, and a file name during saving, respectively. The MFP 101 displays the parameters set with the buttons 1108 to 1111 on the buttons 1108 to 1111. The operator can confirm the parameters set by display of the buttons 1108 to 1111.

The operator finishes inputting the parameters of the "scan and save application" to be registered, and presses a shortcut register button 1112 on the scan and save screen

1100. If the pressing of the shortcut register button 1112 is detected (S621), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes the IC card association process (S605), and then ends the shortcut addition process.

Figure 14:
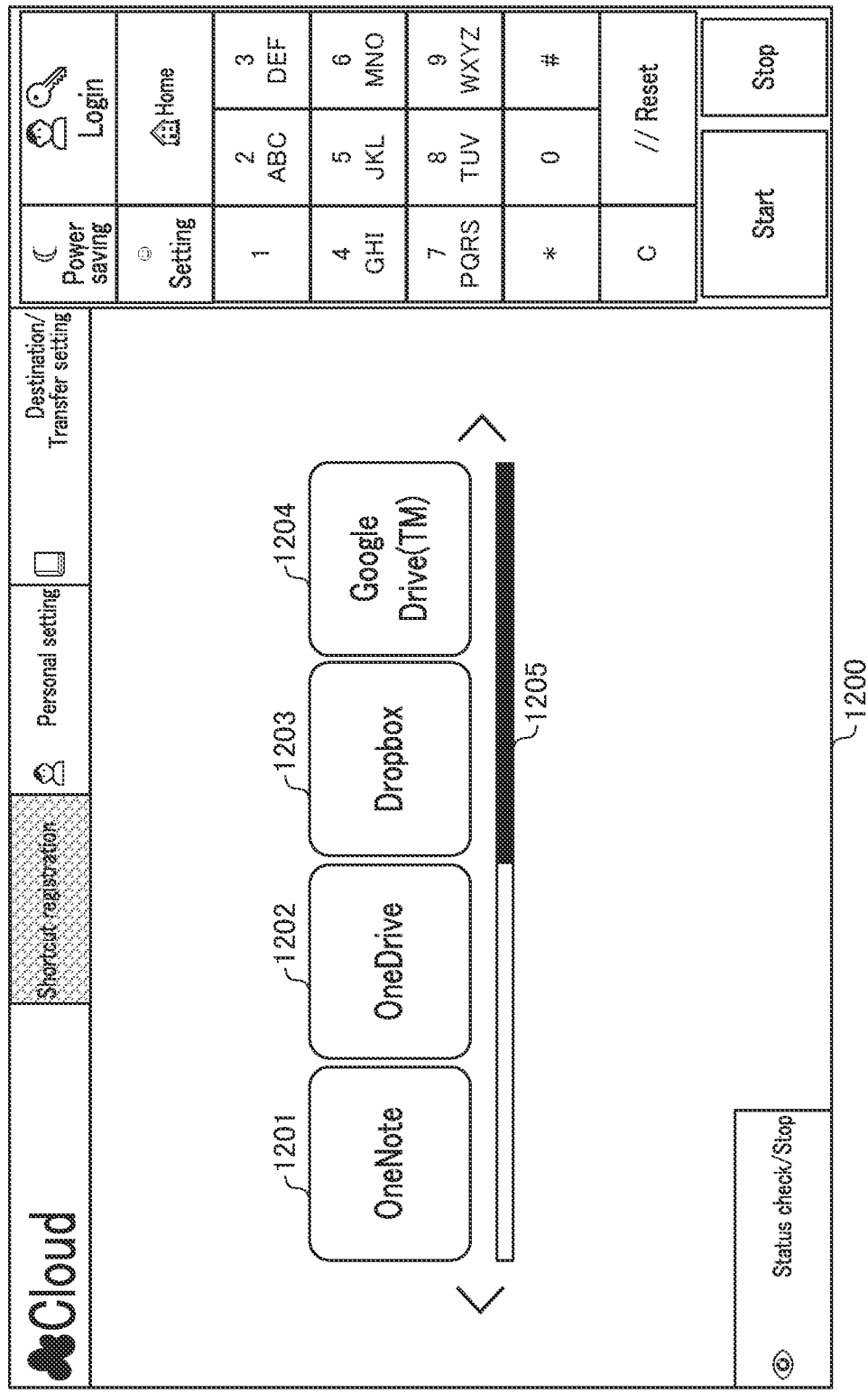
FIG. 14 is a diagram illustrating an example of a cloud service selection screen in the embodiment of the present invention.

Next, if the function selection button 705 is pressed on the function selection screen 700 and the "cloud application" is selected (S622), the display operation control unit 201 displays a cloud service selection screen 1200 shown in FIG. 14 as an example on the display 119 (S623).

Figure 15:
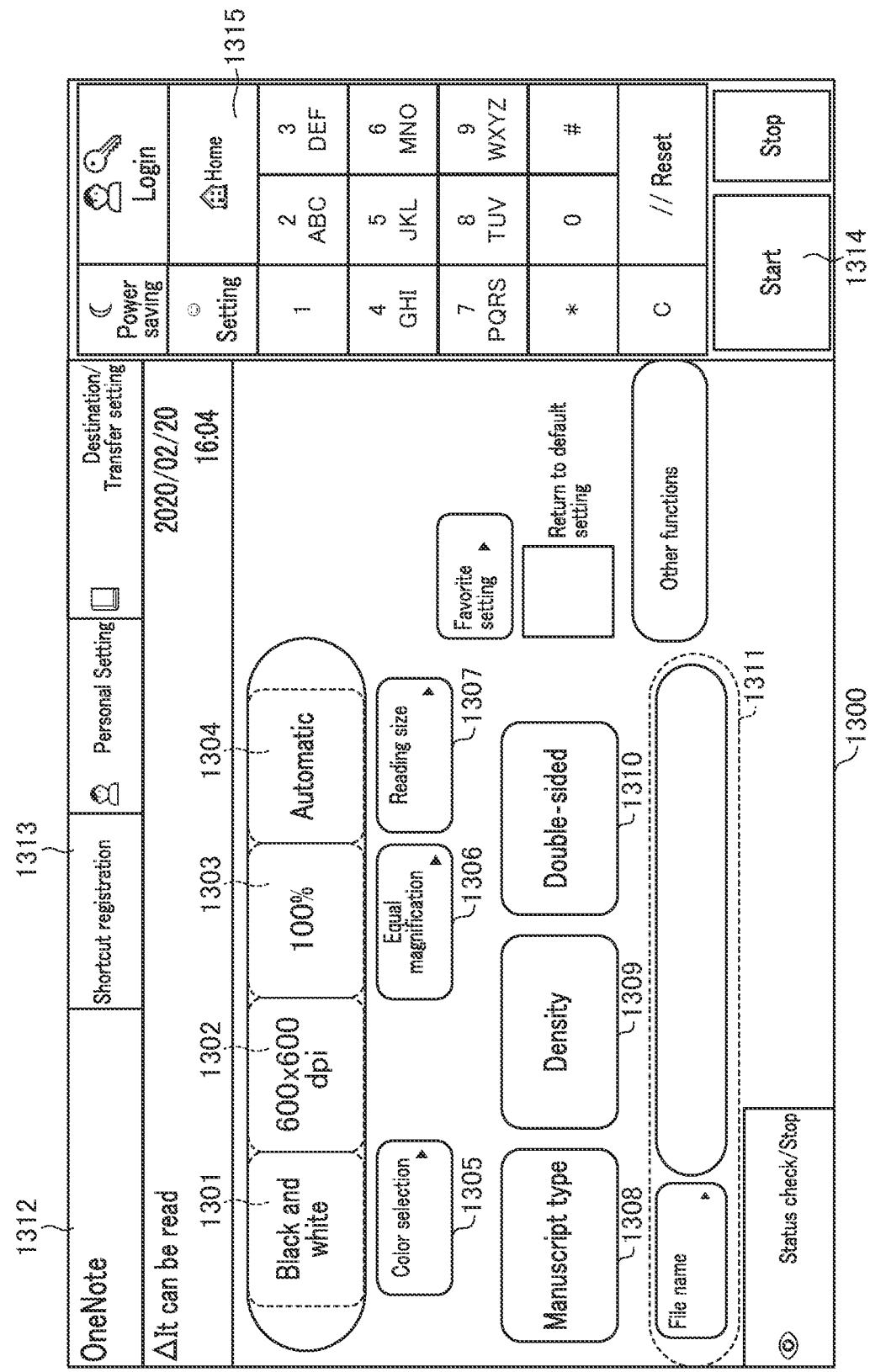
FIG. 15 is a diagram illustrating an example of a cloud screen in the embodiment of the present invention.

On the cloud service selection screen 1200, a cloud service to be used can be selected by pressing cloud service buttons 1201, 1203 and 1204. The cloud services that can be used need not be limited to those described here, and other cloud services can be made available. In addition, if services that can be used do not fit on one screen, it can be configured to operate a scroll bar 1205 and make page transition. If any of the cloud service buttons 1201 to 1204 is pressed and a cloud service is selected, the display operation control unit 201 displays a cloud screen 1300 shown in FIG. 15 as an example on the display 119 (S623).

On the cloud screen 1300, the parameters used by the "cloud application" can be set with buttons 1305, 1306 and 1307. The buttons 1305 to 1307 correspond to a color mode, a magnification, and manuscript size. The MFP 101 displays the parameters set with the buttons 1305 to 1307 on display fields 1301, 1303 and 1304. The operator can confirm the parameters set by display of the display fields 1301, 1303 and 1304. Meanwhile, in the present example, the resolution is fixed and is displayed in a display field 1302, but the resolution may also be capable of being set with a parameter button.

In addition, on the cloud screen 1300, the parameters used by the "cloud application" can be set with buttons 1308, 1309, 1310 and 1311. The buttons 1308 to 1311 correspond to the type of manuscript, density, double-sided scanning, and a file name during saving, respectively. The MFP 101 displays the parameters set with the buttons 1308 to 1311 on the buttons 1308 to 1311. The operator can confirm the parameters set by display of the buttons 1308 to 1311. In addition, the MFP 101 displays a cloud service name corresponding to the pressed cloud service button in a cloud service name display area 1312.

The operator finishes inputting the parameters of the "cloud application" to be registered, and presses a shortcut register button 1313 on the cloud screen 1300. If the pressing of the shortcut register button 1313 is detected (S625), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes the IC card association process (S605), and then ends the shortcut addition process.

Figure 16:
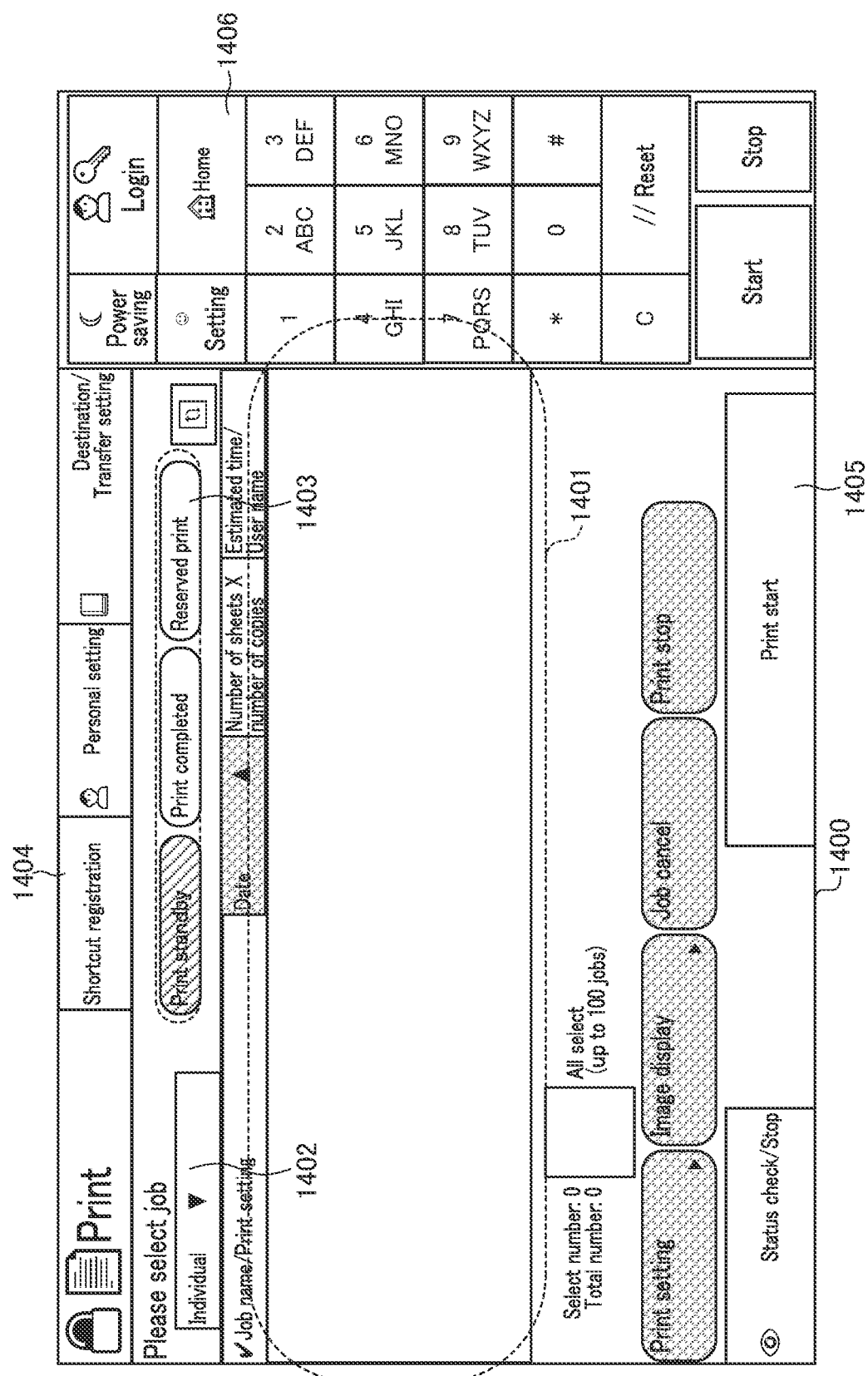
FIG. 16 is a diagram illustrating an example of a print screen in the embodiment of the present invention.

Next, if the function selection button 706 is pressed on the function selection screen 700 and the "print application" is selected (S626), the display operation control unit 201 displays a print screen 1400 shown in FIG. 16 as an example on the display 119 (S627).

On the print screen 1400, a list of print jobs received by the document use control unit 207 through the network control unit 203 is displayed on a print job list display unit 1401. The operator can confirm a list of print jobs by display of the print job list display unit 1401. The MFP 101 narrows down the print jobs which are displayed on the print job list display unit 1401 in accordance with the settings of a release range narrowing setting 1402 and a status narrowing setting 1403. The operator can narrow down the jobs which are displayed on the print job list display unit 1401 by setting the release range narrowing setting 1402 and the status narrowing setting 1403. In the release range narrowing setting 1402, "individual" and "shared" can be selected, and in the case of being logged in, only a print job executed by a logged-in user can be displayed on the print job list display unit 1401. In the status narrowing setting 1403, any of "print standby," "print completion," and "reserved print" which are the status of the print job can be selected. By setting the status narrowing setting 1403, only a job corresponding to a selected status can be displayed on the print job list display unit 1401.

The operator finishes inputting the parameters of the "print application" to be registered, and presses a shortcut register button 1404 on the print screen 1400. If the pressing of the shortcut register button 1404 is detected (S628), the MFP 101 confirms whether a shortcut addition location has been designated (S603). If the operator presses the icon 409 and executes the shortcut addition process, the location of the icon 409 has already been designated as the shortcut addition location. Therefore, in this case, the MFP 101 stores the shortcut in the storage device 120 as it is through the storage device I/F 116 (S604), executes the IC card association process (S605), and then ends the shortcut addition process.

Next, if cancel is selected and the end of the shortcut addition process is selected on the function selection screen 700 (S629), the MFP 101 ends the shortcut addition process (S606), returns to S602 if cancel is not selected, and continues the process. The selection of cancel involves, for example, pressing a home button 707.

Figure 17:
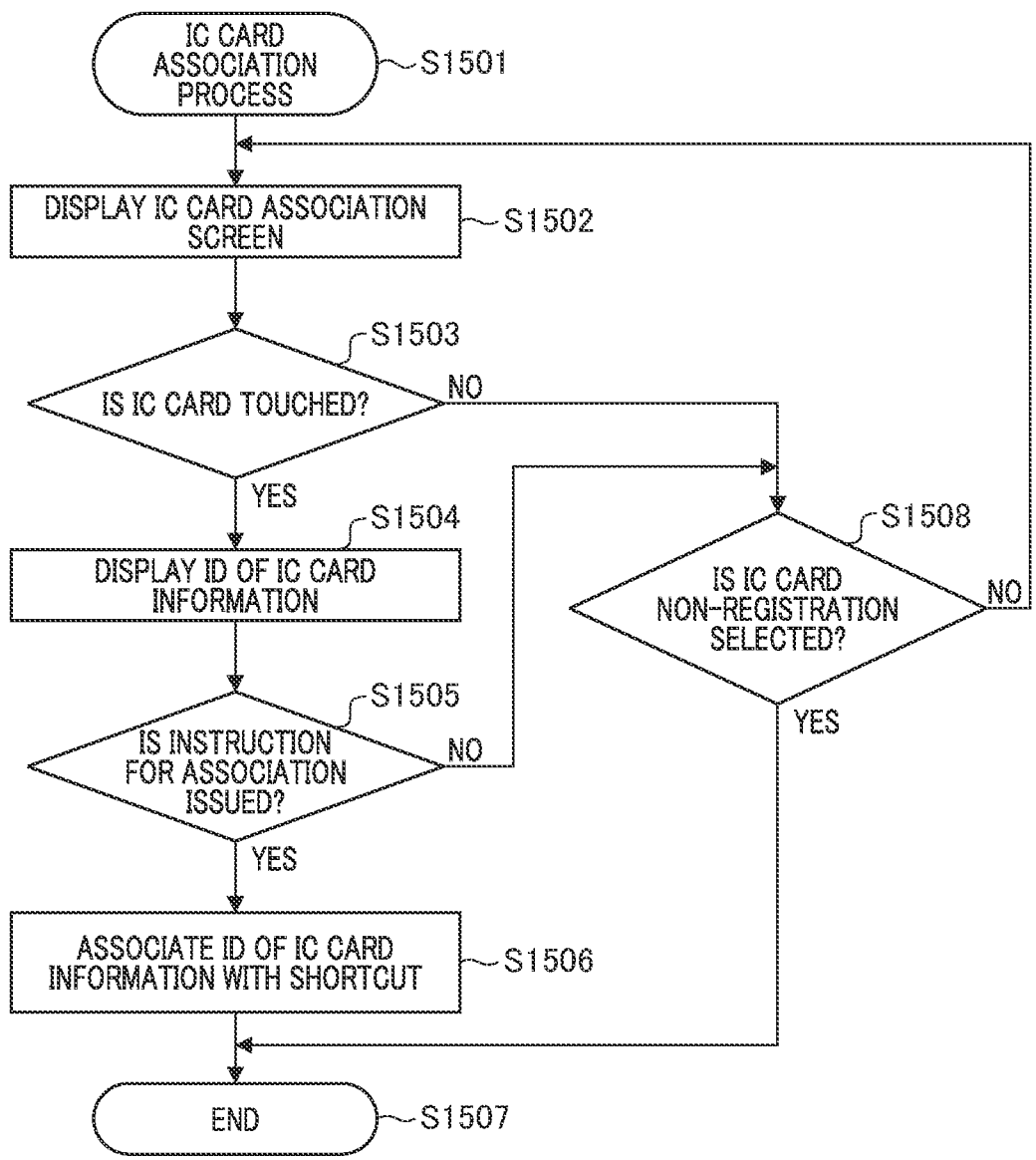
FIG. 17 is a flowchart illustrating an example of an IC card association process in the embodiment of the present invention.

Next, the IC card association process (S605) which is executed in the shortcut addition process will be described with reference to the flowchart of FIG. 17.

Figure 18:
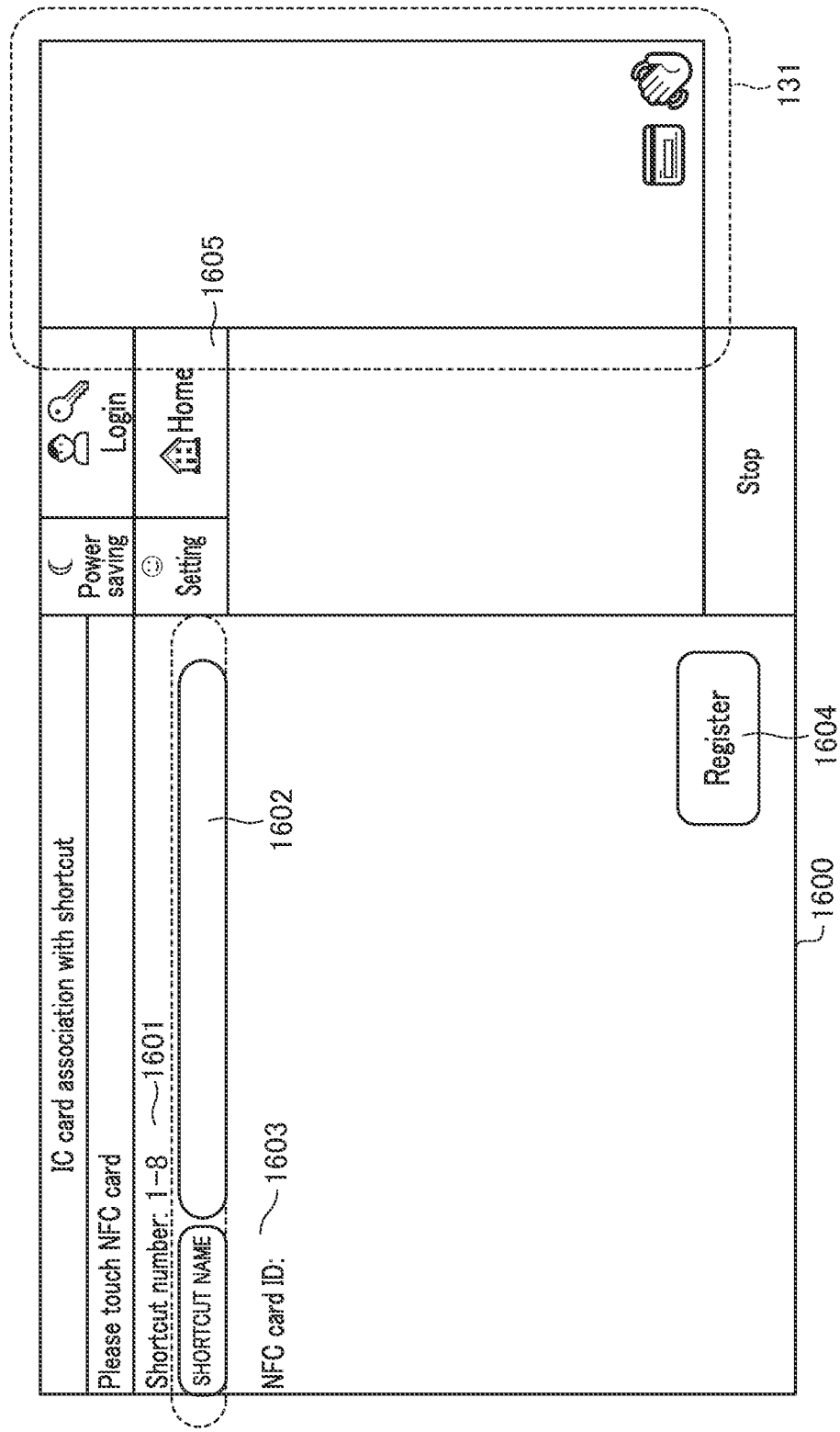
FIG. 18 is a diagram illustrating an example of an IC card association screen in the embodiment of the present invention.

If the process is started (S1501), the display operation control unit 201 displays a IC card association screen 1600 shown in FIG. 18 as an example on the display 119 (S1502). The IC card association screen 1600 has a shortcut number display area 1601, a shortcut name input area 1602, and an NFC card ID display area 1603.

A number indicating a shortcut registration location is displayed in the shortcut number display area 1601. If the shortcut name input area 1602 is pressed, the MFP 101 starts up a soft keyboard (not shown), and accepts an input of a shortcut name which is set for the shortcut from the soft keyboard. The soft keyboard is displayed on, for example, the display 119.

In addition, if an IC card is touched to the IC card reading device 131 (S1503), the IC card control unit 210 uses the IC card reading device 131 to read an ID of the IC card from the touched IC card. The MFP 101 displays the read ID in the NFC card ID display area 1603 (S1504).

Thereafter, if a registration button 1604 is pressed and the association of the IC card with the shortcut is established (S1505), the MFP 101 proceeds to S1506. In S1506, the MFP 101 associates the shortcut with the ID of the IC card, stores it in the storage device 120 through the storage device I/F 116, and then ends the process (S1507). In addition, if a home button 1605 is pressed and the end of the IC card association process is indicated (S1508), the MFP 101 ends the process as it is (S1507).

Figure 19:
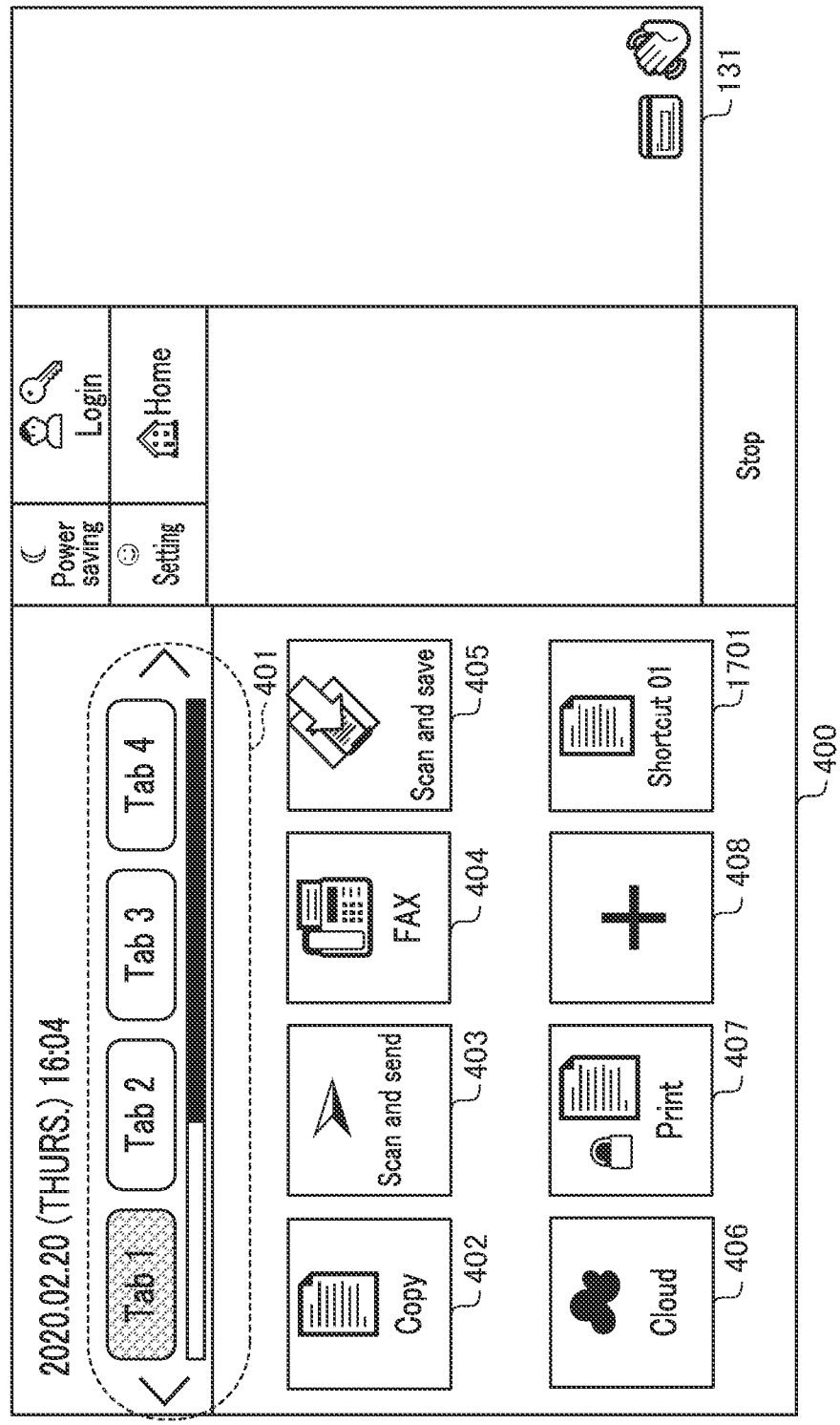
FIG. 19 is a diagram illustrating an example of a home screen after shortcut addition in the embodiment of the present invention.

If the shortcut addition process is completed, display of the home screen 400 is updated, and the screen is changed to the home screen 400 shown in FIG. 19 as an example. On the home screen 400 of FIG. 19, a shortcut icon 1701 is registered at a location where the icon 409 existed on the home screen 400 of FIG. 5. FIG. 19 is a diagram in which the shortcut of the "copy application" is registered in the shortcut icon 1701, but shortcuts of other applications may of course be registered.

Next, returning to the flowcharts of FIGS. 3 and 4, an operation when a shortcut call is selected (S309) will be described. The shortcut call is executed by the IC card being touched to the IC card reading device 131 or the shortcut icon 1701 being pressed.

If an instruction for the shortcut call is issued, the MFP 101 executes a shortcut call process (S310), and returns to display of the home screen 400 (S302). Hereinafter, the details of the shortcut call process of S310 will be described with reference to the flowcharts of FIGS. 20 and 21.

Figure 20:
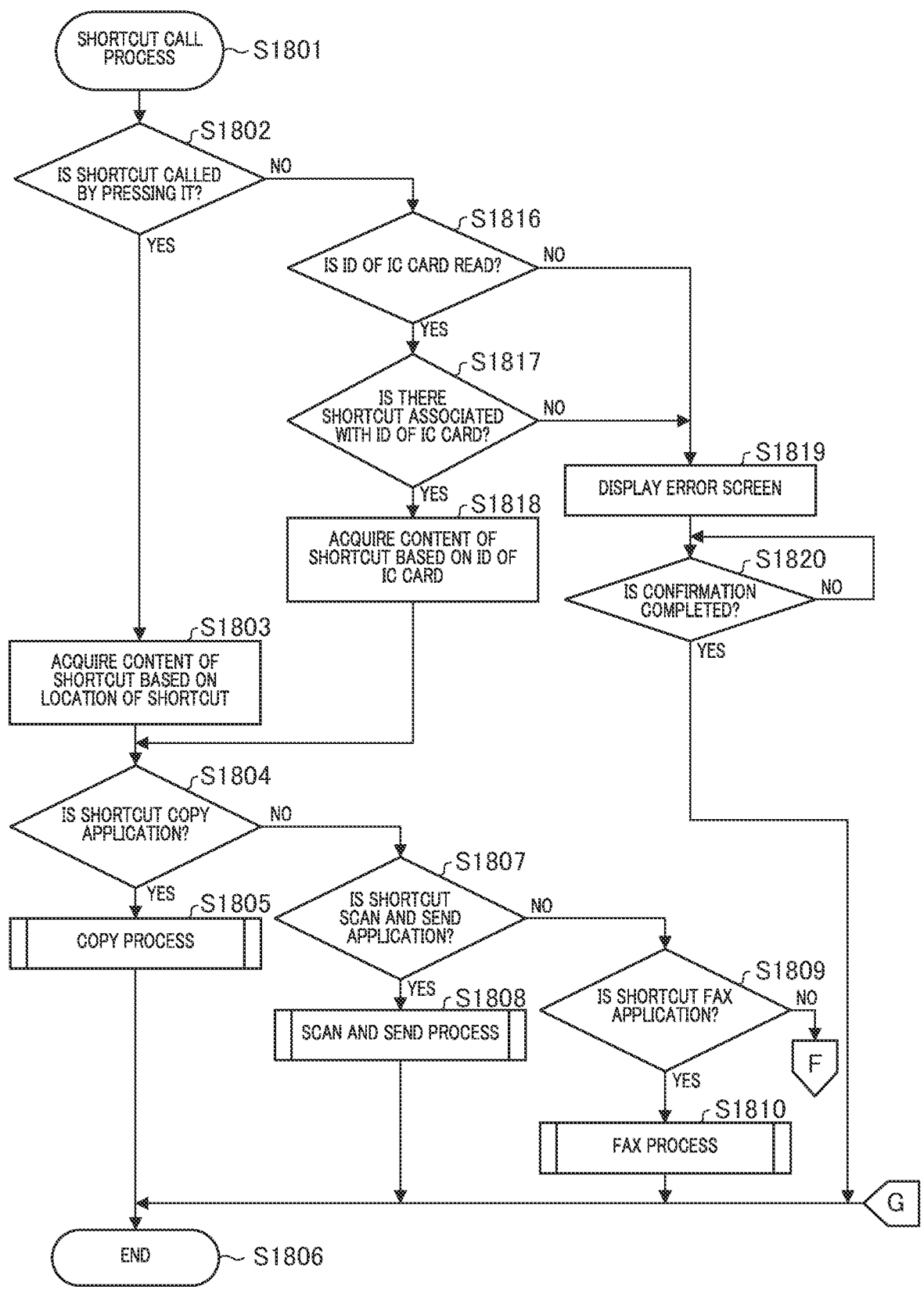
FIG. 20 is a flowchart illustrating an example of a shortcut call process in the embodiment of the present invention.
Figure 21:
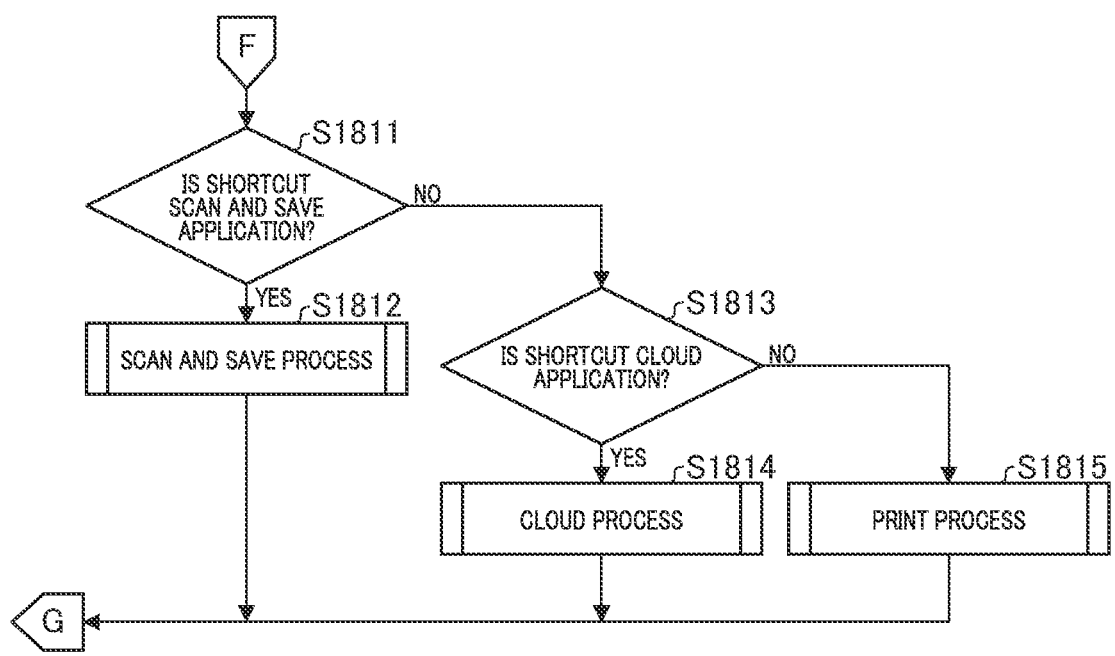
FIG. 21 is a flowchart illustrating an example of the shortcut call process in the embodiment of the present invention.

FIGS. 20 and 21 are flowcharts of the shortcut call process. If a call of a shortcut is performed, the screen of an application registered in the shortcut is displayed. This screen is displayed in a state in which parameters used in an application registered at the time of shortcut registration are set.

If the shortcut call process is started (S1801), the MFP 101 first confirms whether the shortcut icon 1701 is pressed and the shortcut is called (S1802). If the shortcut icon 1701 is pressed, the MFP 101 acquires the setting content of the shortcut associated with the location of the pressed shortcut icon 1701 from the storage device 120 through the storage device I/F 116 (S1803).

Next, the MFP 101 confirms what an application set as the shortcut is. If the confirmed result is the "copy application" (S1804), the MFP 101 performs a copy process (S1805). If the confirmed result is the "scan and send application" (S1807), the MFP 101 performs a scan and send process (S1808). If the confirmed result is the "fax application" (S1809), the MFP 101 performs a fax process (S1810). If the confirmed result is the "scan and save application" (S1811), the MFP 101 performs a scan and save process (S1812). If the confirmed result is the "cloud application" (S1813), the MFP 101 performs a cloud process (S1814). If the confirmed result is none (S1813), the MFP 101 performs a print process (S1815). After each process is performed, the MFP 101 ends the process (S1806).

Next, a case where the shortcut is not called by pressing the shortcut icon 1701 will be described. If the shortcut icon 1701 is not pressed, the IC card control unit 210 confirms whether the ID of the IC card can be read from the touched IC card using the IC card reading device 131 (S1816). If the ID of the IC card can be read from the IC card, the MFP 101 confirms whether a shortcut associated with the ID is registered (S1817). The MFP 101 confirms S1817 by acquiring information of the shortcut from the storage device 120 through the storage device I/F 116. If the associated shortcut is registered, the MFP 101 acquires the setting content of the shortcut from the storage device 120 through the storage device I/F 116 (S1818), and proceeds to S1804.

Figure 22:
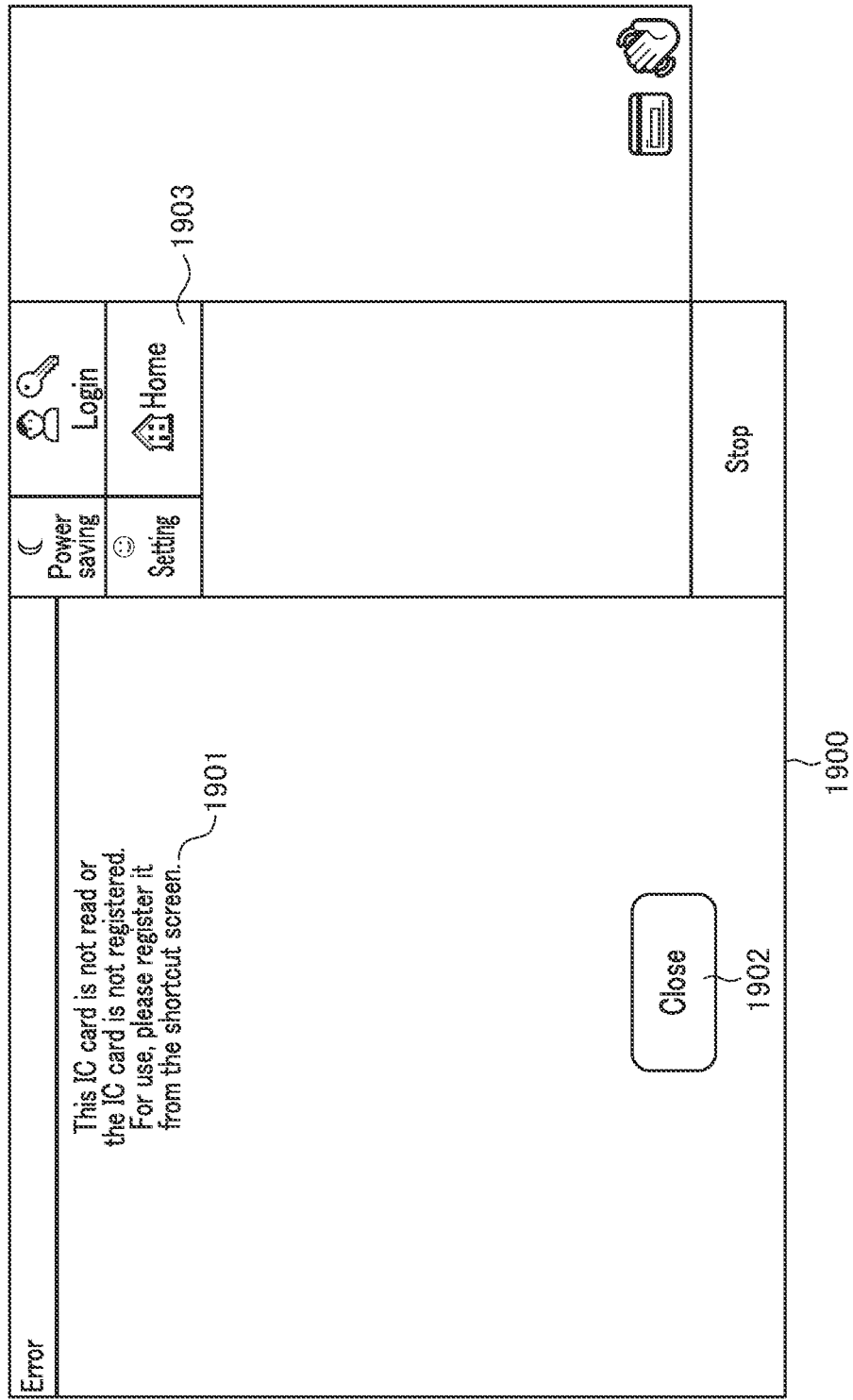
FIG. 22 is a diagram illustrating an example of an error screen in the embodiment of the present invention.

The MFP 101 proceeds to S1819 if the ID of the IC card cannot be read in S1816 or if the associated shortcut is not registered in S1817. In S1819, the display operation control unit 201 displays an error screen 1900 shown in FIG. 22 as an example on the display 119.

The error screen 1900 has an error notification area 1901 for notifying of an error and a close button 1902 for closing the error screen 1900. If the close button 1902 or a home button 1903 is pressed, the MFP 101 determines a user has completed the confirmation of an error (S1820), and ends the process (S1806).

Next, returning to the flowcharts of FIGS. 3 and 4, if the icon 402 is pressed and a copy function is selected (S311), the MFP 101 performs the copy process (S312). Since the copy process is an already-known technique, and thus the detailed description thereof will not be given.

If the icon 403 is pressed and a scan and send function is selected (S313), the MFP 101 performs the scan and send process (S314). Since the scan and send process is an already-known technique, and thus the detailed description thereof will not be given.

If the icon 404 is pressed and a fax function is selected (S315), the MFP 101 performs the fax process (S316). Since the fax process is an already-known technique, and thus the detailed description thereof will not be given.

If the icon 405 is pressed and a scan and save function is selected (S317), the MFP 101 performs the scan and save process (S318). Since the scan and save process is an already-known technique, and thus the detailed description thereof will not be given.

If the icon 406 is pressed and a cloud function is selected (S319), the MFP 101 performs the cloud process (S320). Since the cloud process is an already-known technique, and thus the detailed description thereof will not be given.

If the icon 407 is pressed and a print function is selected (S321), the MFP 101 performs the print process (S322). Since the print process is an already-known technique, and thus the detailed description thereof will not be given.

Figure 23:
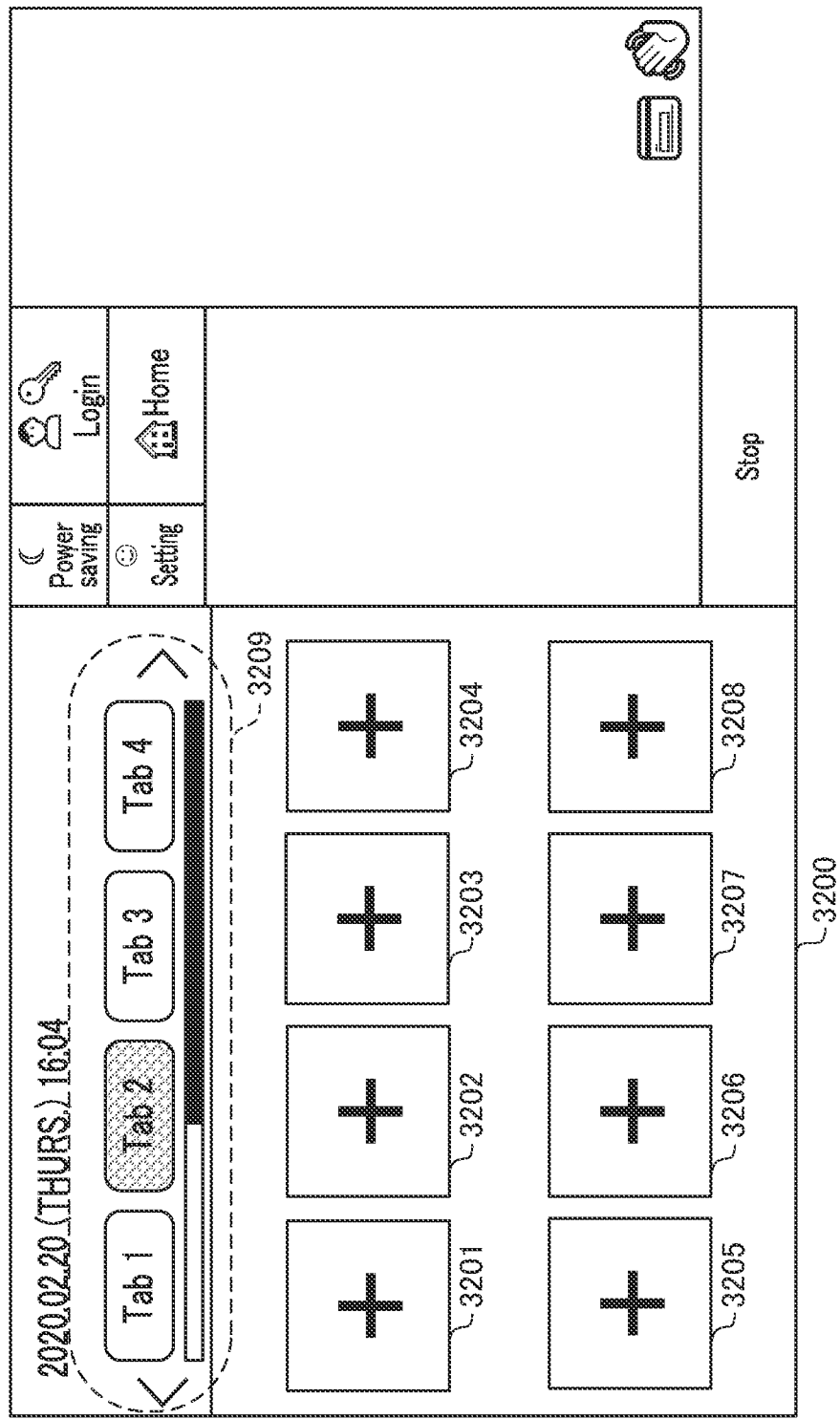
FIG. 23 is a diagram illustrating an example of a screen after page transition in the embodiment of the present invention.

If the tab display area 401 is operated and page transition is selected (S323), the MFP 101 performs a page transition process (S324). Since the page transition process is an already-known technique, and thus the detailed description thereof will not be given. Here, an example of a screen after page transition will be described with reference to FIG. 23. If the tab display area 401 is operated and the page transition is selected (S323), the MFP 101 displays a screen after page transition 3200 shown in FIG. 23 as an example.

On the screen after page transition 3200, the tab display area 401 is updated, and a tab display area 3209 is displayed. On the screen after page transition 3200, icons 3201, 3202, 3203, 3204, 3205, 3206, 3207 and 3208 are displayed. The icons 3201 to 3208 are icons for adding shortcuts.

In the copy process (S312), the scan and send process (S314), the fax process (S316), the scan and save process (S318), the cloud process (S320), and the print process (S322), the function screens of FIG. 10 to FIG. 16 are displayed. Buttons for registering the currently displayed setting values as shortcuts, for example, the buttons 814, 90), 1009, 1112, 1313, and 1404 are displayed on the function screens. If these buttons are pressed, the shortcut addition process already described is executed. If the shortcut addition process is called by these buttons being pressed, unlike a case where the icon 409 is pressed, the functions are selected and shortcut registration locations are not designated. Therefore, display of a function selection screen (S609) is not executed. In addition, in this case, display of a screen for selecting a shortcut registration location (S607) and confirmation of whether the location has been selected (S608) are executed.

Figure 24:
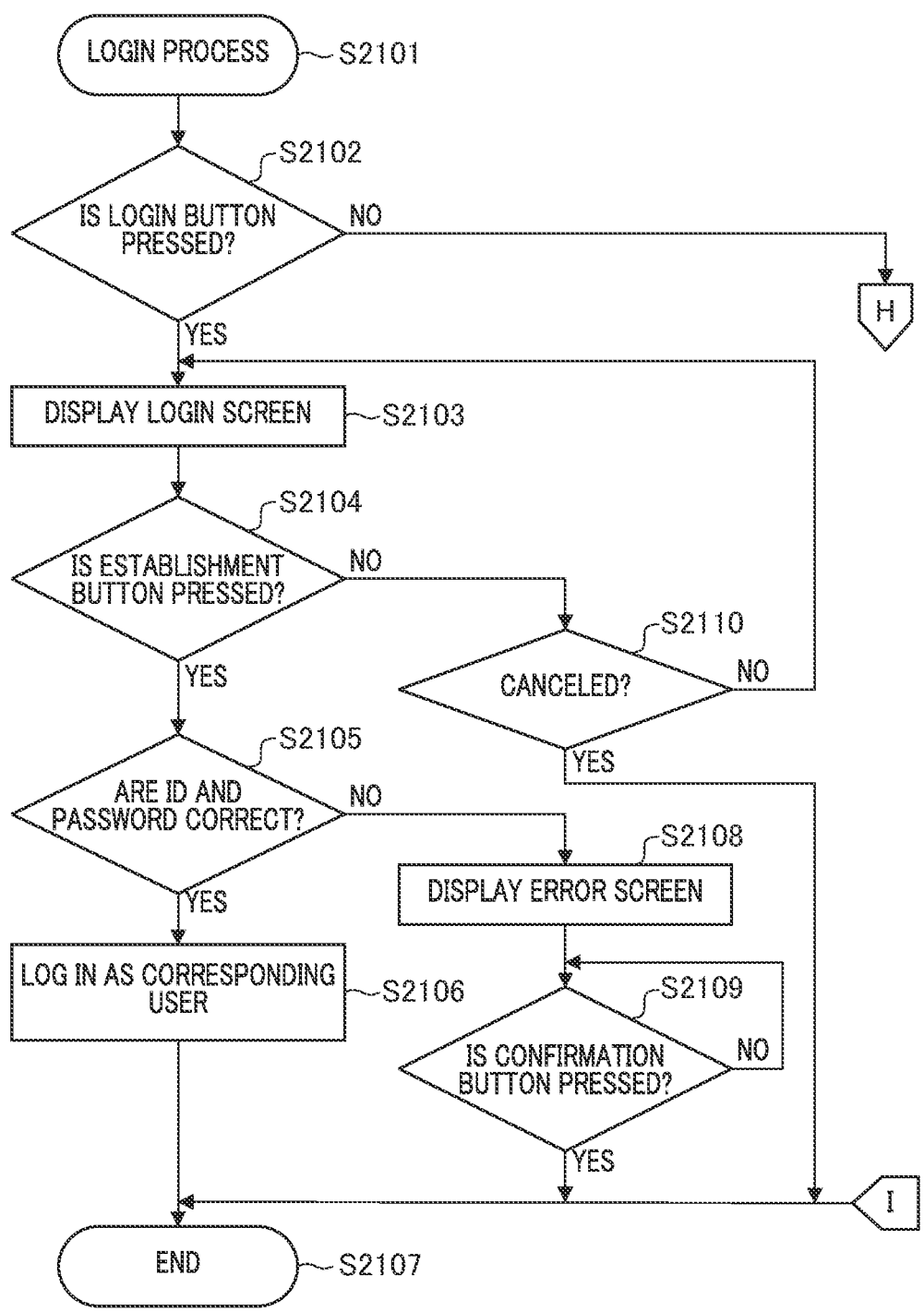
FIG. 24 is a flowchart illustrating an example of a login process in a second embodiment.
Figure 25:
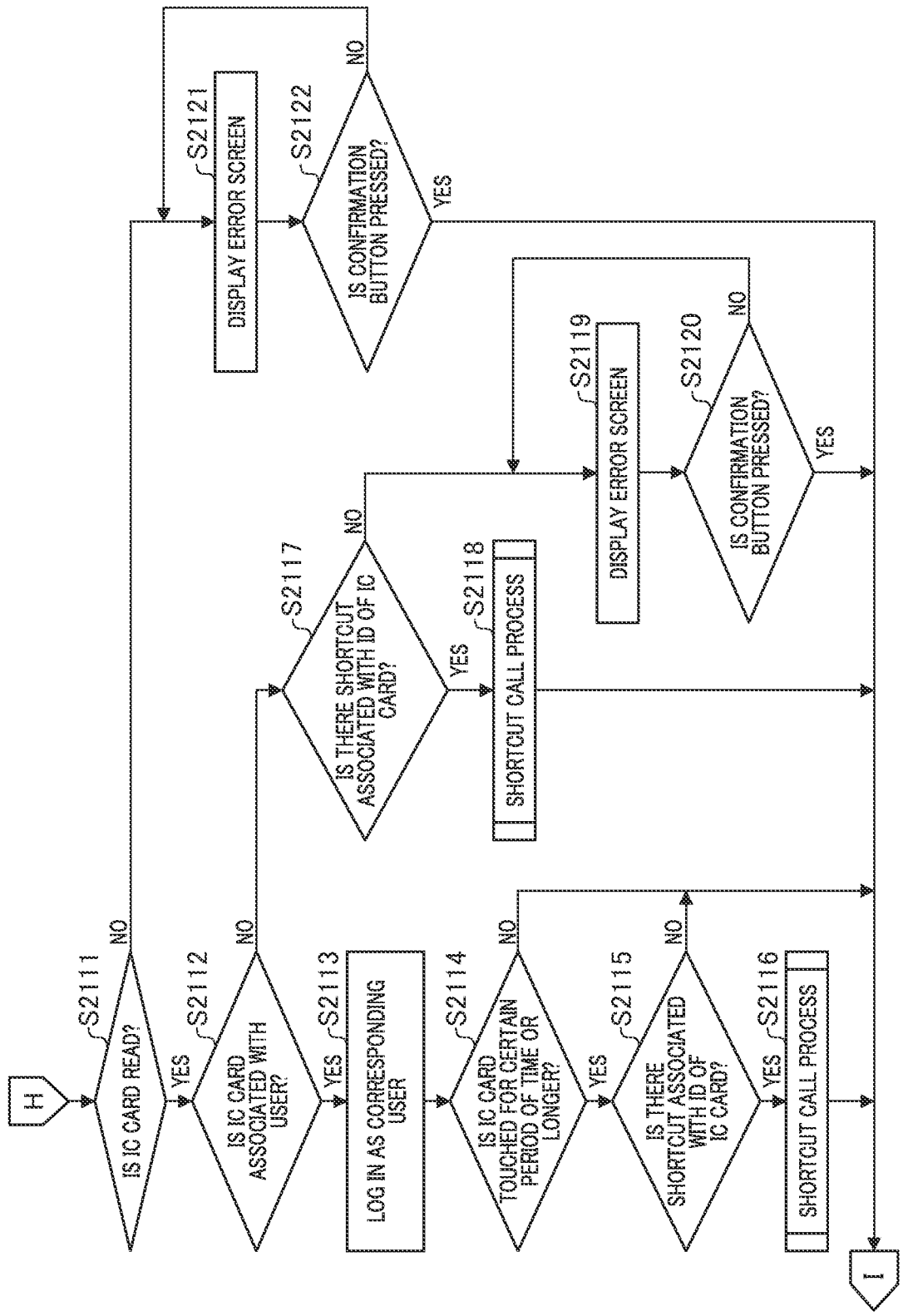
FIG. 25 is a flowchart illustrating an example of the login process in the second embodiment.
Figure 26:
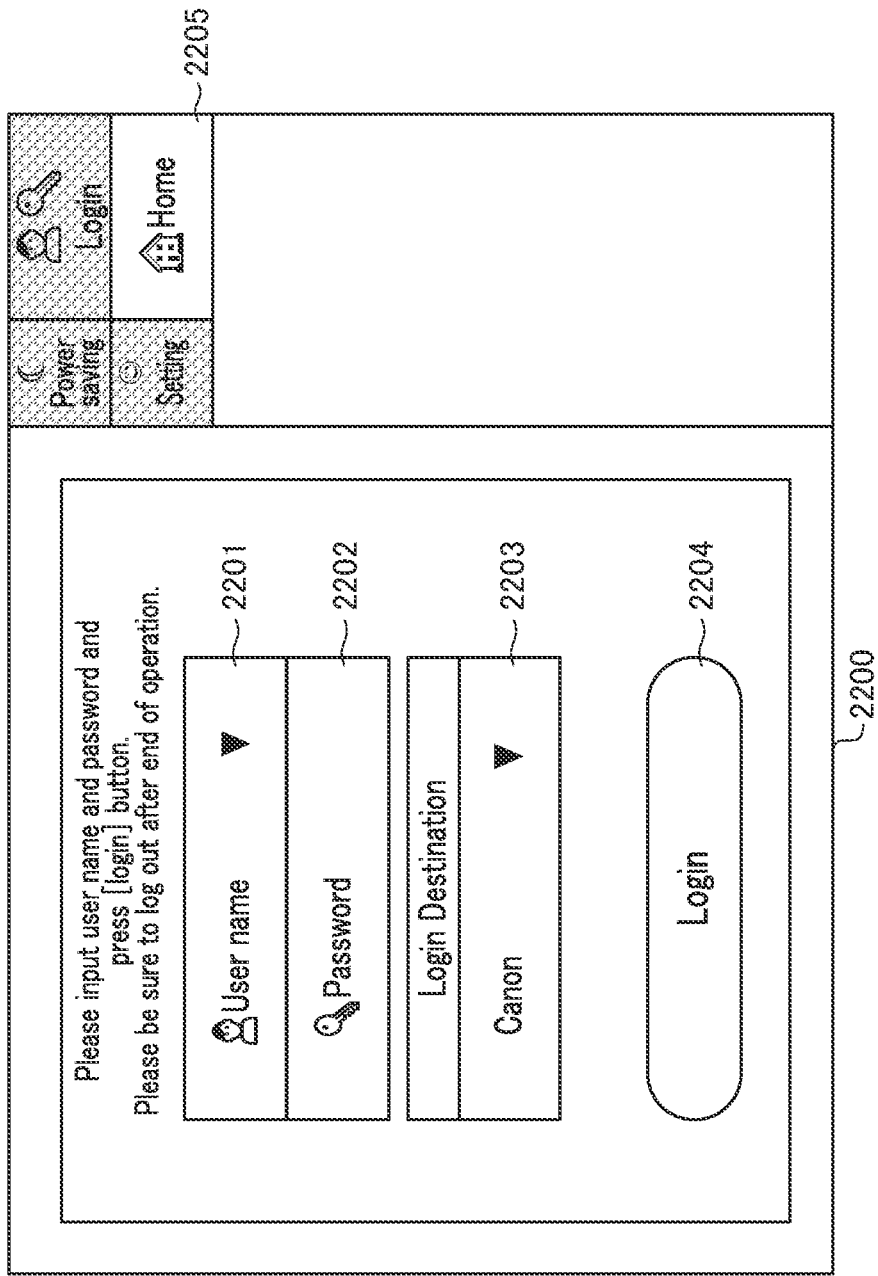
FIG. 26 is a diagram illustrating an example of a login screen in the second embodiment.

Next, the login process (S304) will be described with reference to the flowcharts of FIGS. 24 and 25. If the login process is started (S2101), the MFP 101 first confirms whether an instruction for the login is issued by the login button 410 being pressed (S2102). If the login button 410 is pressed, the MFP 101 displays a login screen 2200 shown in FIG. 26 as an example (S2103). The login screen 2200 has a user name input field 2201, a password input field 2202, a login destination input field 2203, a login button 2204, and a home button 2205. Whether authentication is normally performed by the authentication control unit 202 depends on whether information input to the user name input field 2201, the password input field 2202, and the login destination input field 2203 is correct.

Figure 27:
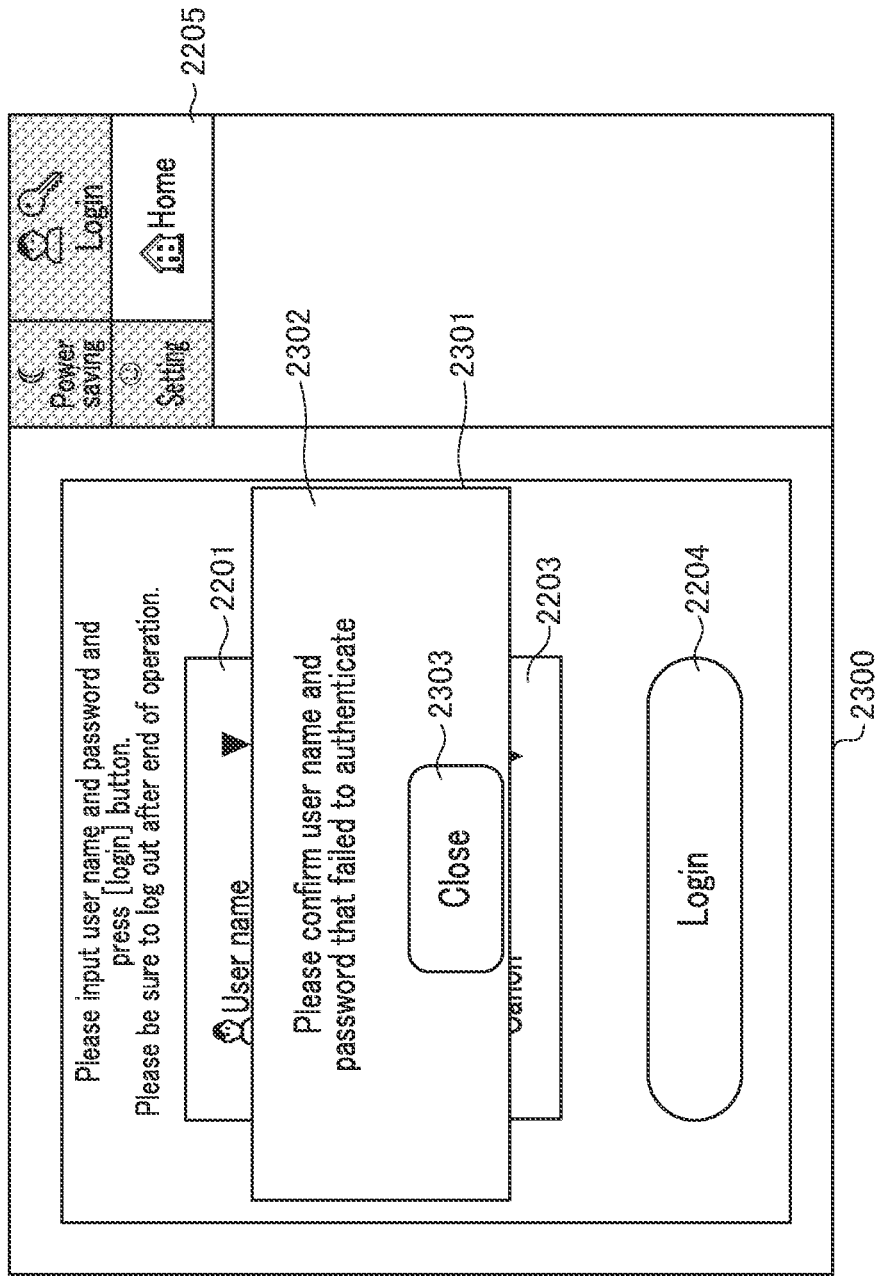
FIG. 27 is a diagram illustrating an example of an error screen in the second embodiment.

Next, if the login button 2204 is pressed and the input is established (S2104), the MFP 101 confirms whether the contents of the user name input field 2201, the password input field 2202, and the login destination input field 2203 are correct (S2105). If the contents are correct in S2105, the MFP 101 logs in as a user which is input to the user name input field 2201 (S2106), and ends the process (S2107). If the contents are not correct in S2105, the MFP 101 displays an error screen 2300 shown in FIG. 27 as an example (S2108). The MFP 101 displays a pop-up 2301 for notifying of an error on the error screen 2300, notifies of the content of the error through message 2302, and ends the process (S2107) by a close button 2303 being pressed (S2109).

If the login button 2204 is not pressed, the MFP 101 confirms whether the home button 2205 is pressed and an instruction for cancel is issued (S2110). The MFP 101 ends the process if cancel is performed (S2107), and returns to S2103 if cancel is not performed.

Next, a process when the login button 410 is not pressed in S2102 will be described. The MFP 101 confirms whether the IC card control unit 210 can read the ID of the IC card using the IC card reading device 131 (S2111). If it can read the ID of the IC card, the MFP 101 confirms whether the IC card is registered as a user's IC card for login registered in the MFP 101 on the basis of the read ID of the IC card (S2112). If the IC card is registered, the MFP 101 logs in as a user associated with the IC card (S2113). In addition, after login, the MFP 101 confirms whether the IC card has been touched to the IC card reading device 131 for a certain period of time or longer (S2114). If it is touched for a certain period of time or longer, the MFP 101 confirms whether the shortcut associated with the ID read in S2111 is registered in the storage device 120 (S2115). The MFP 101 executes the shortcut call process if it is registered (S2116), and ends the process as it is if it is not registered (S2107).

The IC card of S214 being touched to the IC card reading device 131 for a certain period of time or longer is an example of a case where the same card information is detected during a login state according to the login process. In addition, this is, for example, a case where an operation of continuously bringing the card having the card information close to a card detection unit of the image processing apparatus or an operation of keeping the card having the card information in contact with the card detection unit is performed. The IC card reading device 131 is an example of the card detection unit.

The ID of the IC card associated with a user is an example of card information associated with a user account. The process of proceeding from S2112 to S2113 is an example of an execution unit configured to execute, if card information associated with a user account is detected, a login process to the image processing apparatus based on the user account. The process of proceeding from S2115 to S2116 is an example of a control unit configured to call, if the same card information is detected during the login state according to the login process, a shortcut corresponding to the card information in the login state.

Figure 28:
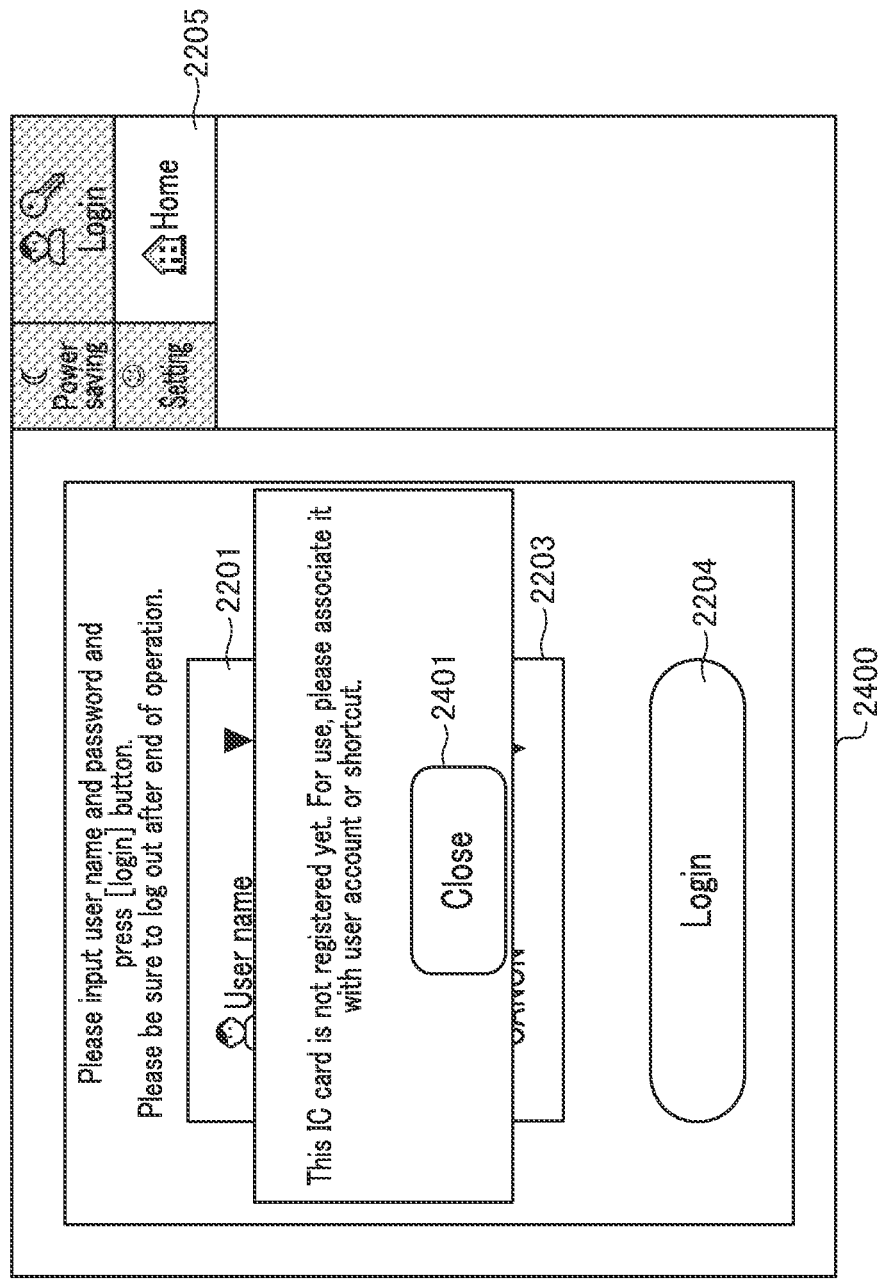
FIG. 28 is a diagram illustrating an example of an error screen in the second embodiment.

If the card is not registered as a user's IC card for login in S2112, the MFP 101 confirms whether the shortcut associated with the ID read in S2111 is registered in the storage device 120 (S2117). If the shortcut is registered, the MFP 101 executes the shortcut call process (S2118), and ends the process (S2107). If the shortcut is not registered, the MFP 101 displays an error screen 2400 shown in FIG. 28 as an example (S2119), ends the process if a close button 2401 is pressed (S2120), and returns to S2119 if the close button is not pressed.

Figure 29:
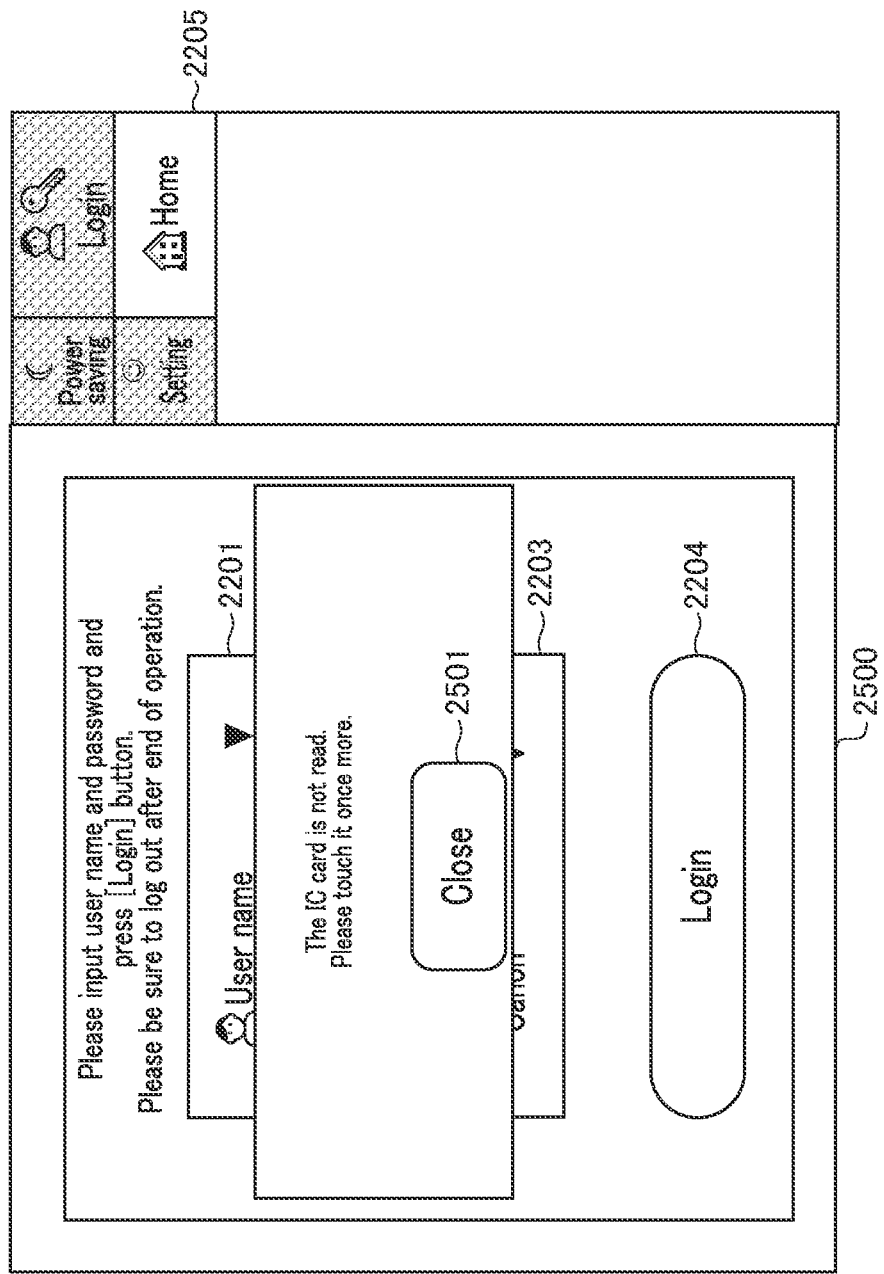
FIG. 29 is a diagram illustrating an example of an error screen in the second embodiment.

If the ID of the IC card cannot be read in S2111, the MFP 101 displays an error screen 2500 shown in FIG. 29 as an example (S2121). The MFP 101 ends the process if a close button 2501 is pressed (S2122), and returns to S2121 if the close button is not pressed.

Figure 30:
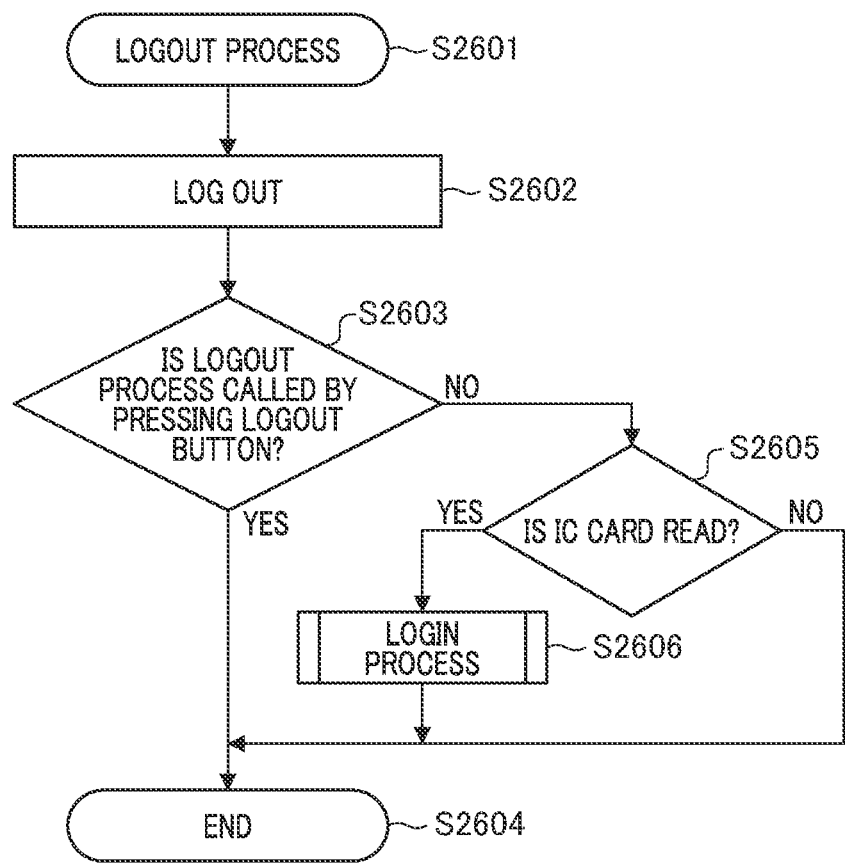
FIG. 30 is a flowchart illustrating an example of a logout process in the second embodiment.

Finally, a logout process (S306) will be described with reference to the flowchart of FIG. 30. If the process is started (S2601), the MFP 101 first logs out (S2602), and then confirms whether the logout button 501 is pressed and the logout process is called (S2603). If the logout process is called by pressing the logout button 501, the MFP 101 ends the process as it is (S2604). If the logout process is called by methods other than pressing the logout button 501, the MFP 101 confirms whether the IC card can be read (S2605). As a case where the logout process is called by methods other than pressing the logout button 501, there is a case where an IC card for login associated with a user different from the logged-in user is touched to the IC card reading device 131. The MFP 101 performs the login process (S2606) and then ends the process (S2604) if it can be read in S2605, and ends the process as it is (S2604) if it cannot be read.

Second Embodiment

Figure 31:
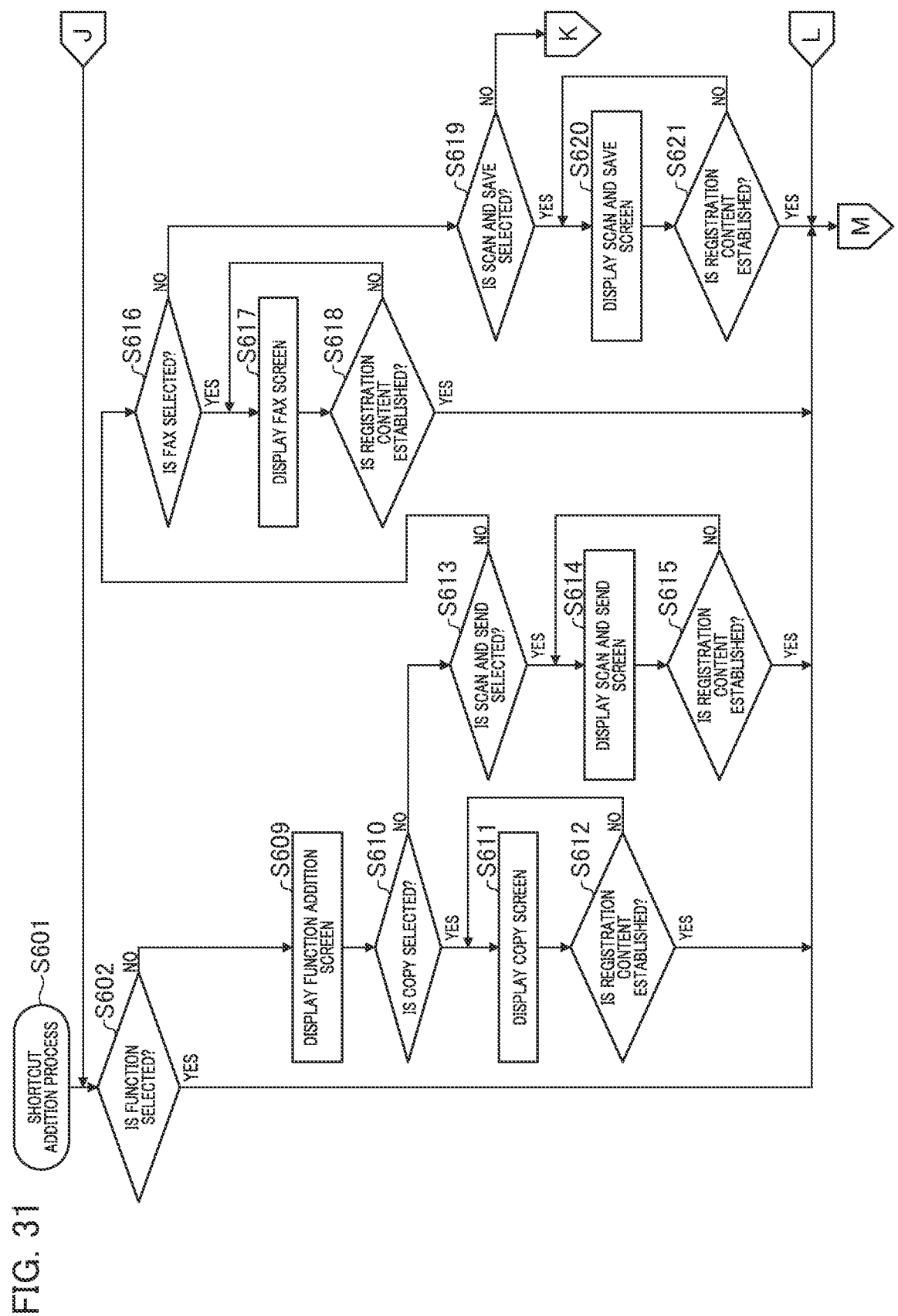
FIG. 31 is a flowchart illustrating an example of a shortcut addition process in the second embodiment.
Figure 32:
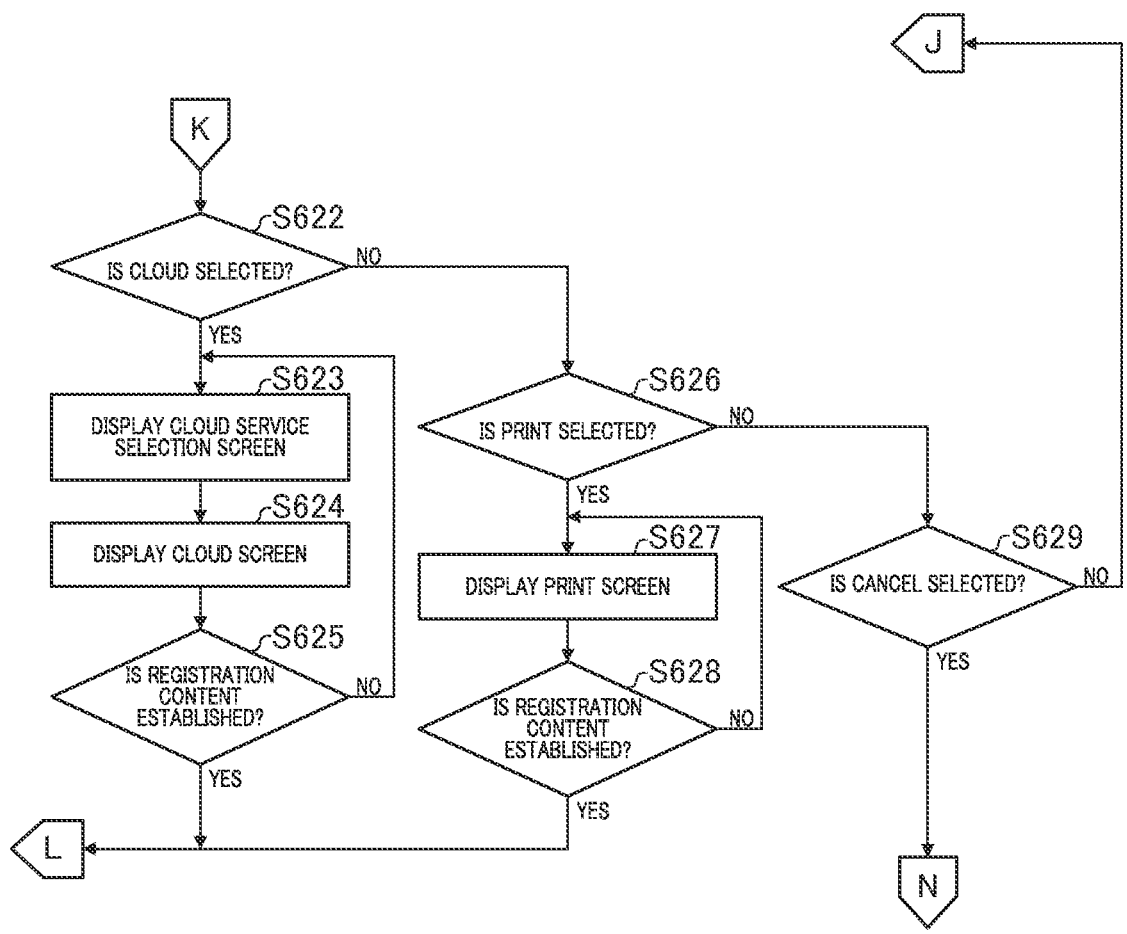
FIG. 32 is a flowchart illustrating an example of the shortcut addition process in the second embodiment.
Figure 33:
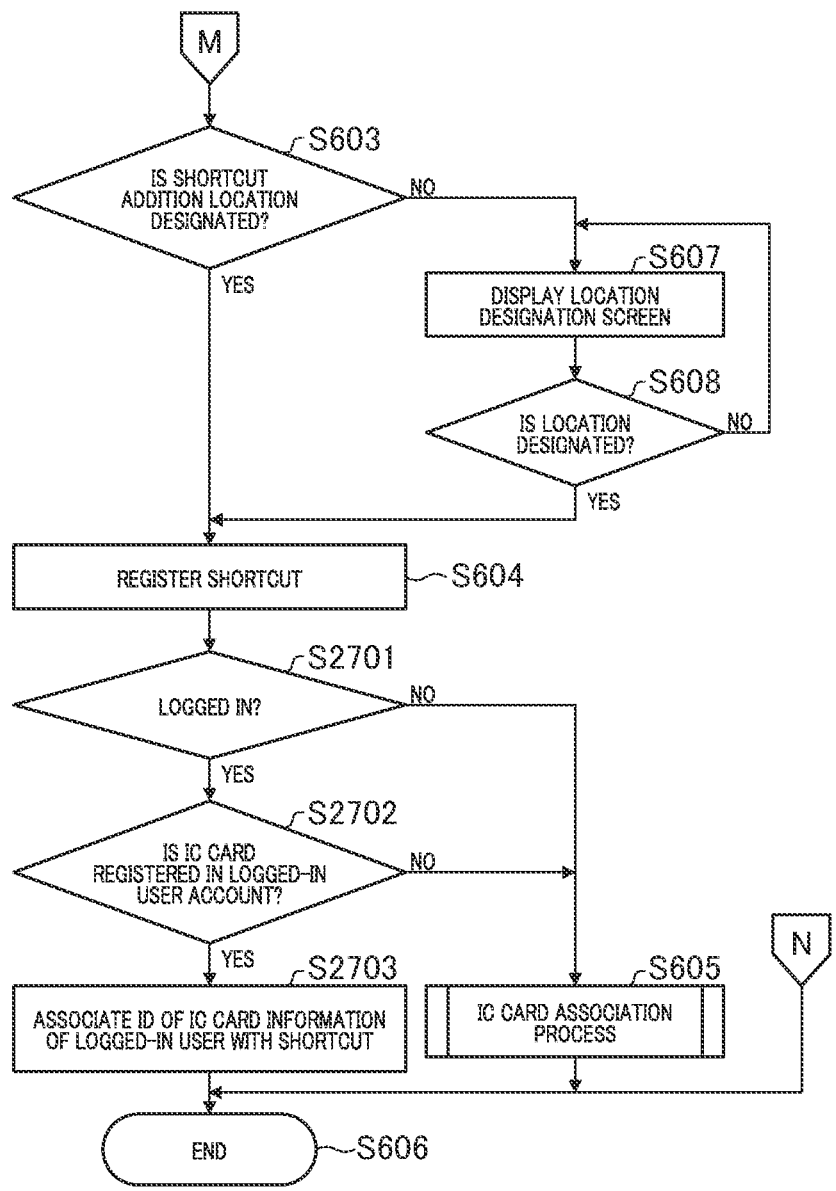
FIG. 33 is a flowchart illustrating an example of the shortcut addition process in the second embodiment.

A second embodiment is an embodiment in which the shortcut addition process of the first embodiment is replaced with the flowcharts of FIGS. 31, 32, and 33. In the flowcharts of FIGS. 31, 32, and 33, the same processes as those in the flowcharts of FIGS. 7 and 8 are denoted by the same reference numerals and signs, and thus the description thereof will not be given.

A shortcut addition process of the second embodiment is the same as the shortcut addition process of FIGS. 7 and 8 up to S604. The MFP 101 registers a shortcut in S604, and then confirms whether a user is currently logged in to the MFP 101 (S2701). If the user is logged in, the MFP 101 confirms whether the ID of the IC card is registered in a logged-in user account (S2702). If the ID is registered, the MFP 101 associates the ID with a shortcut registered in S604 (S2703), and ends the process (S606). If the user is not logged in to the MFP 101 in S2701 or the ID of the IC card is not registered in S3902, the MFP 101 performs the IC card association process (S605) in the same manner as in the first embodiment.

Third Embodiment

Figure 34:
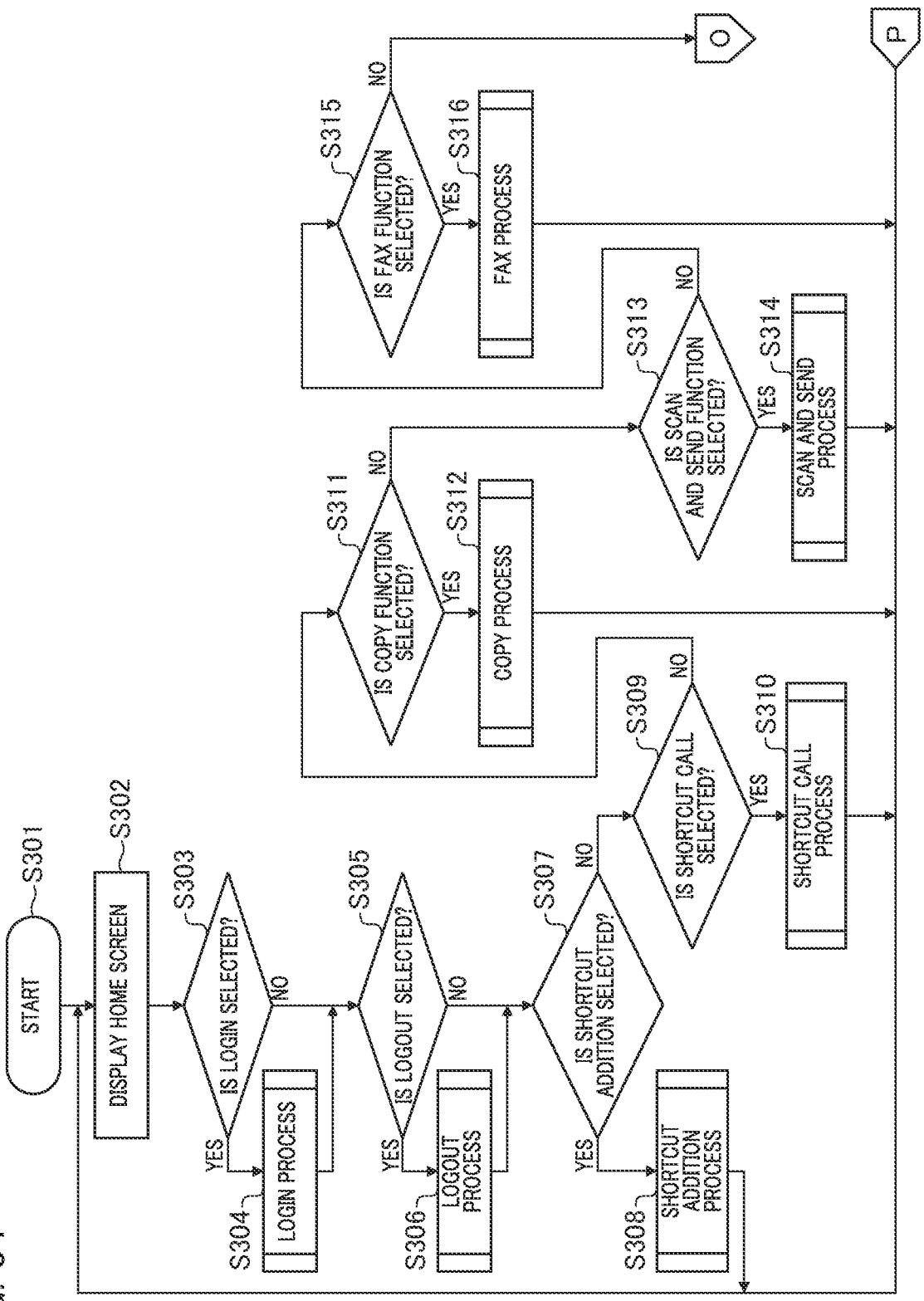
FIG. 34 is a flowchart illustrating an example of a third embodiment.
Figure 35:
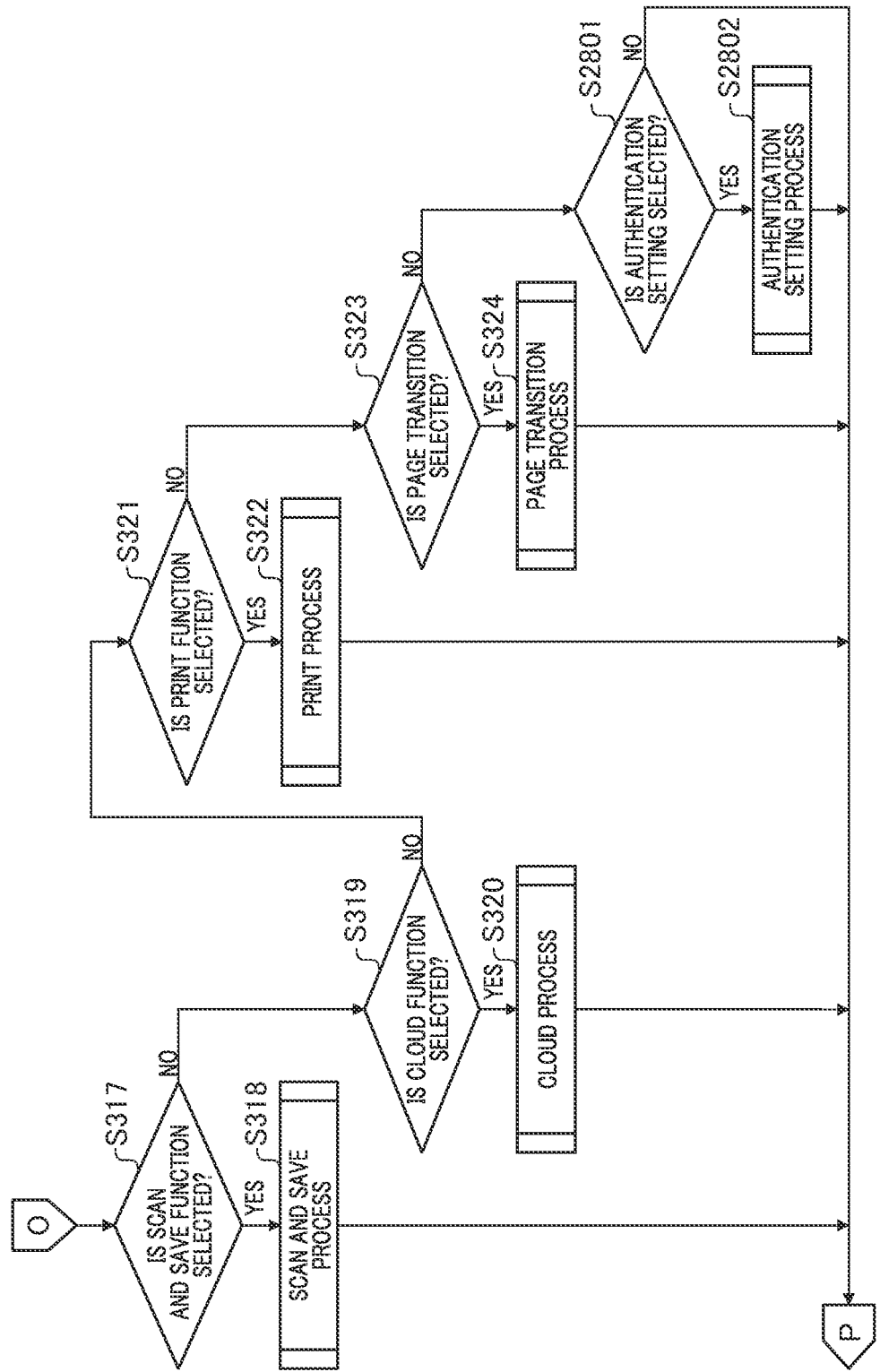
FIG. 35 is a flowchart illustrating an example of the third embodiment.

A third embodiment is an embodiment in which the first embodiment and the second embodiment are replaced with the flowcharts of FIGS. 34 and 35. In the flowcharts of FIGS. 34 and 35, the same processes as those in the flowcharts of FIGS. 3 and 4 are denoted by the same reference numerals and signs, and thus the description thereof will not be given.

In the third embodiment, the MFP 101 adds the processes of S2801 and S2802 if an instruction for the page transition is not issued in S323.

If a setting button 411 of the home screen 400 is pressed and an authentication setting process is selected (S2801), the MFP 101 performs the authentication setting process (S2802) and returns to S302. If it is not selected, the MFP 101 returns to S302 without executing the authentication setting process. Meanwhile, the MFP 101 can make various settings other than the authentication setting, and it is possible to transition to various types of setting screens by pressing the setting button 411. However, since these settings are known techniques, they are omitted in the present embodiment.

Figure 36:
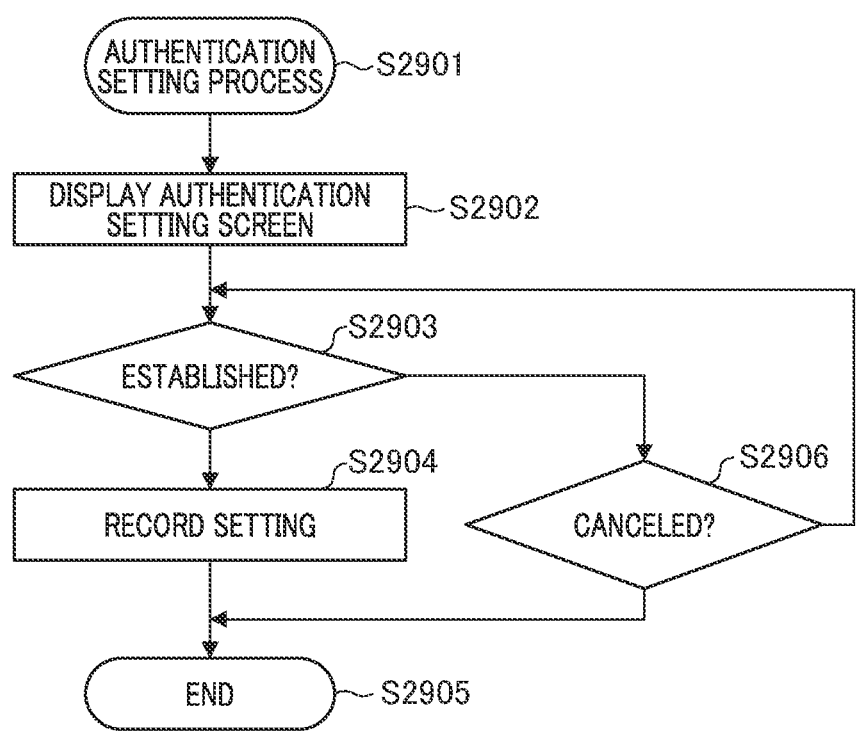
FIG. 36 is a flowchart illustrating an example of an authentication setting process in the third embodiment.
Figure 37:
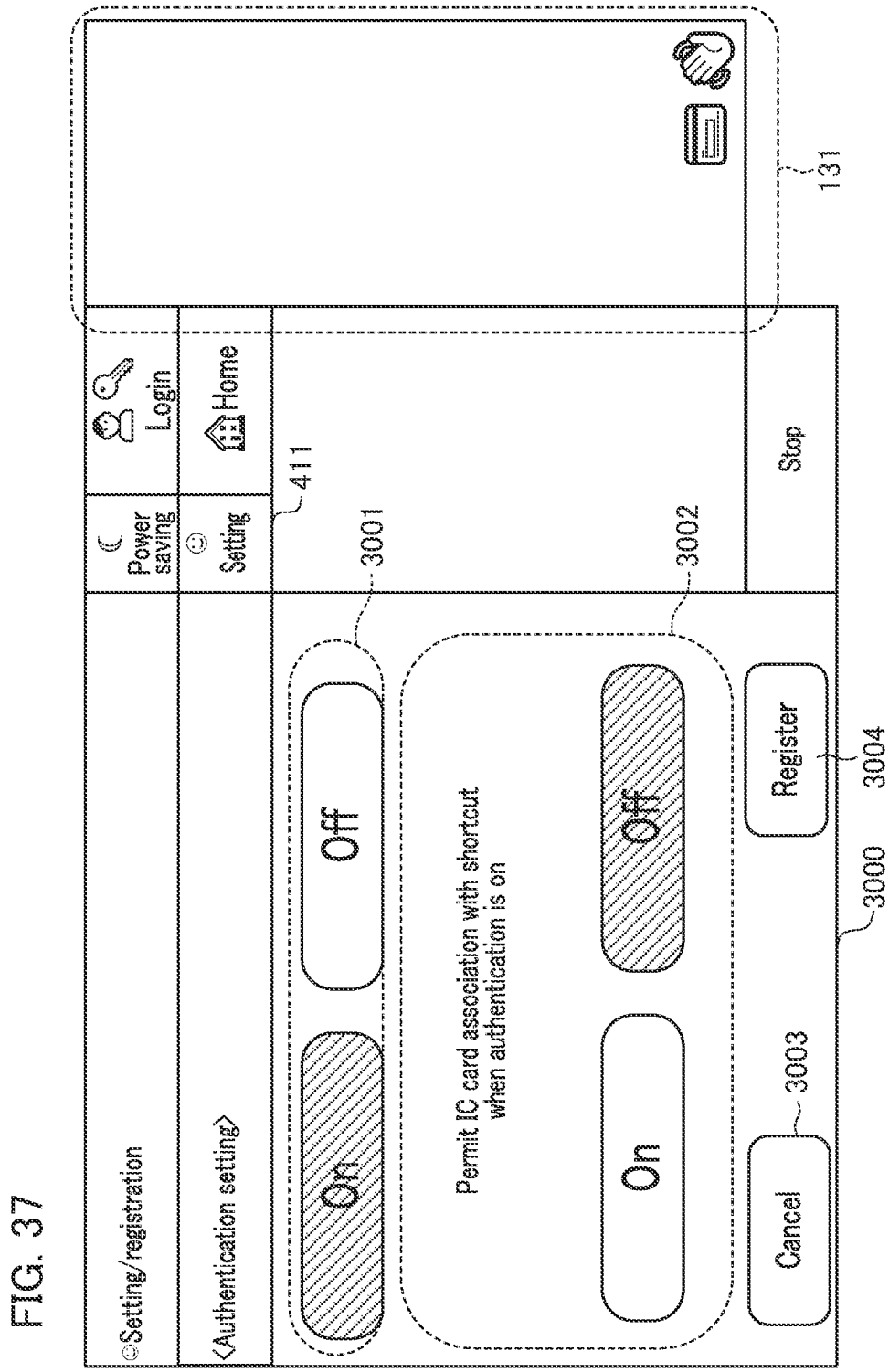
FIG. 37 is a diagram illustrating an example of an authentication setting screen in the third embodiment.

The authentication setting process will be described with reference to the flowchart of FIG. 36. If the process is started (S2901), the MFP 101 displays an authentication setting screen 3000 shown in FIG. 37 as an example (S2902). An authentication setting switch 3001 for setting the validity/invalidity of authentication and an authentication-time operation setting switch 3002 for setting whether the association of the IC card with a shortcut is permitted during authentication validity are displayed on the authentication setting screen 3000. Further, a registration button 3004 for registering changes made to the authentication setting switch 3001 and the authentication-time operation setting switch 3002 and a cancel button 3003 for canceling without registration are also displayed on the authentication setting screen 3000. The settings made on the authentication setting screen 3000 are registered in the storage device 120, and the authentication setting screen 3000 is displayed in a state in which the settings registered in the storage device 120 are reflected.

If the registration button 3004 is pressed and the setting is established (S2903), the setting content is registered in the storage device 120 (S2904), and the process ends (S2905). If the cancel button 3003 is pressed (S2906), the setting is not registered in the storage device 120, and the process ends as it is (S2905).

Figure 38:
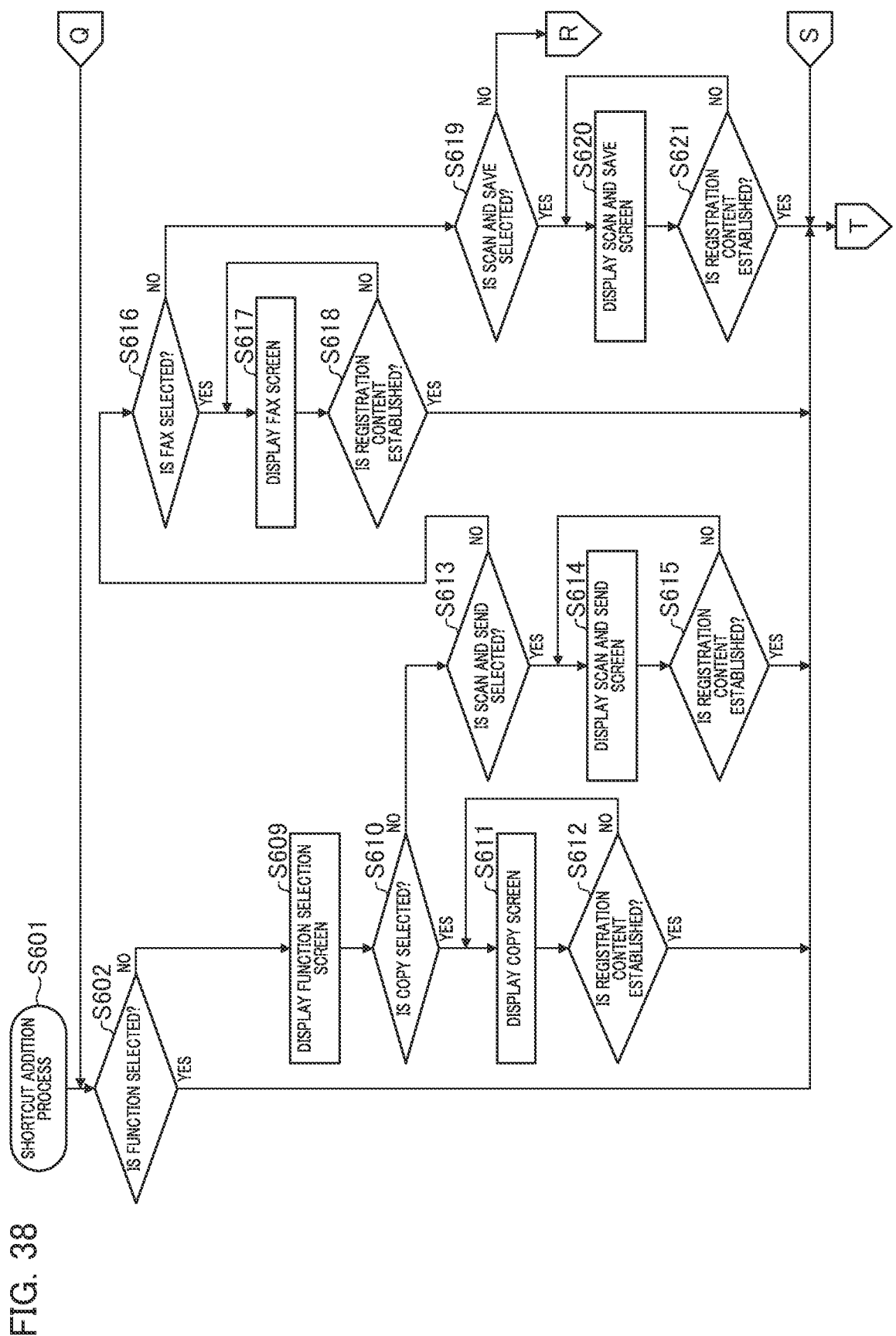
FIG. 38 is a flowchart illustrating an example of a shortcut addition process in the third embodiment.
Figure 39:
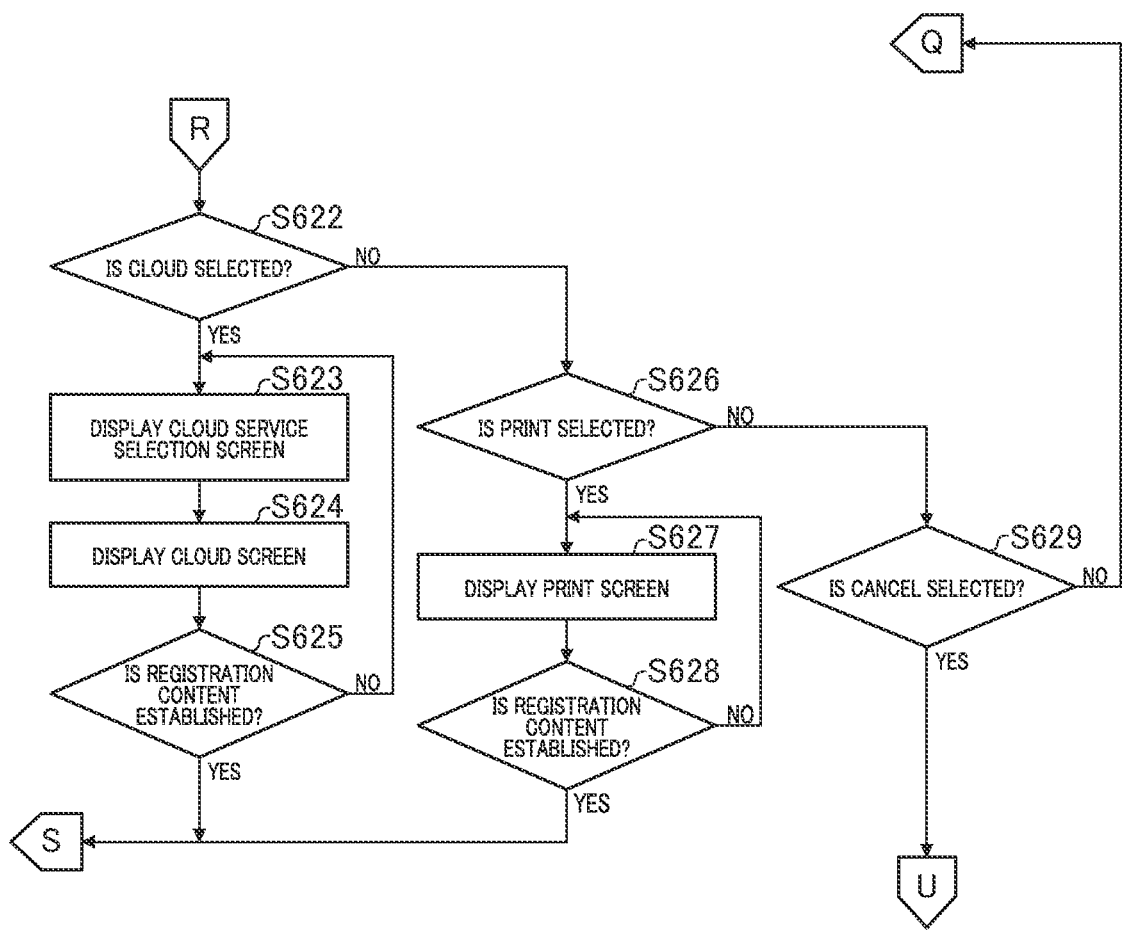
FIG. 39 is a flowchart illustrating an example of the shortcut addition process in the third embodiment.
Figure 40:
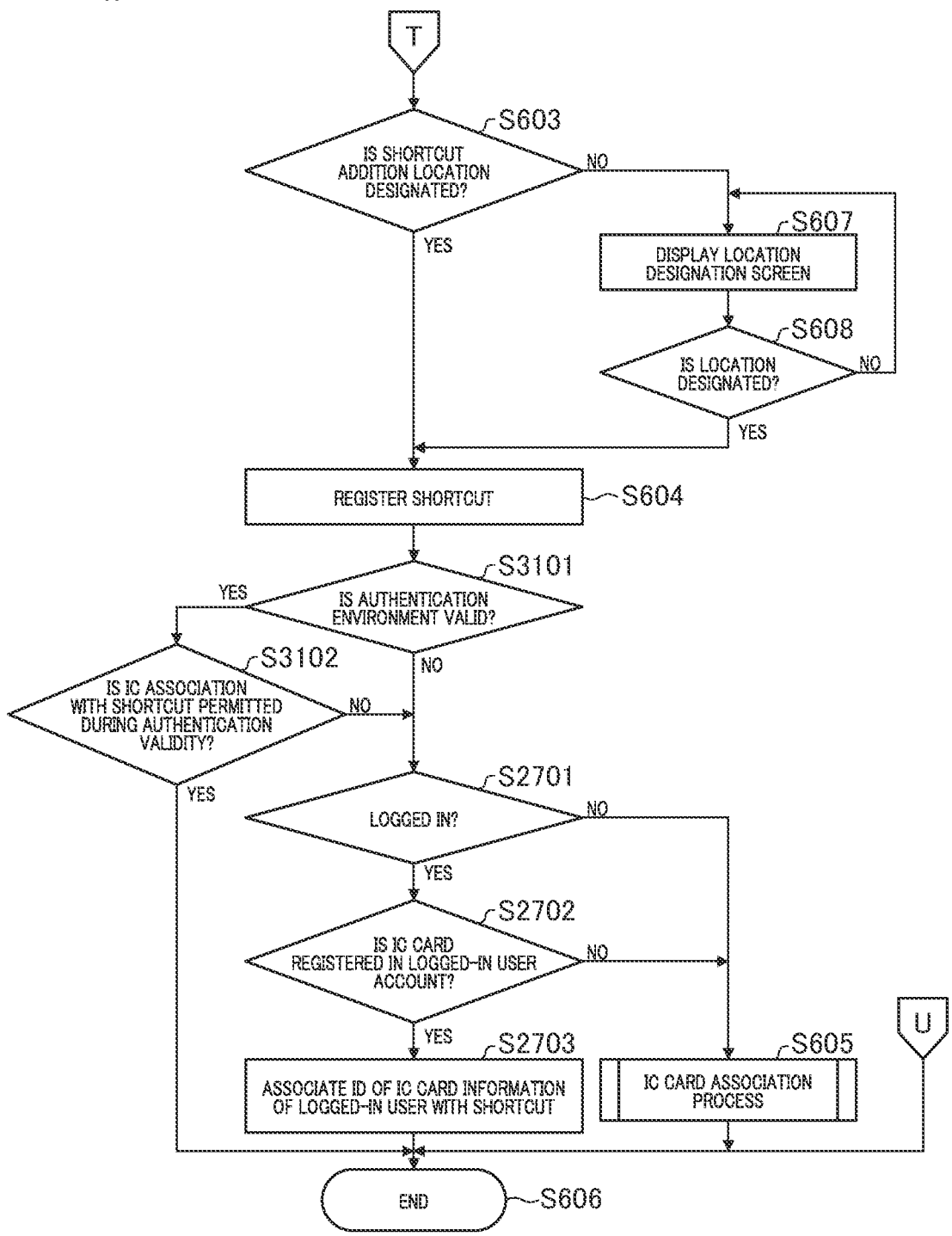
FIG. 40 is a flowchart illustrating an example of the shortcut addition process in the third embodiment.

In addition, in the third embodiment, the shortcut addition process of the first embodiment and the second embodiment is replaced with the flowcharts of FIGS. 38, 39, and 40. In the flowcharts of FIGS. 38, 39, and 40, the same processes as those in the flowcharts of FIGS. 7 and 8, FIG. 31, and FIGS. 32 and 33 are denoted by the same reference numerals and signs, and thus the description thereof will not be given. In the third embodiment, a process of determining the validity/invalidity of an authentication environment (S3101) and a step of determining whether IC association with a shortcut is permitted during authentication validity (S3102) are add to the first embodiment and the second embodiment.

The MFP 101 confirms whether the authentication setting switch 3001 is ON (valid) after the process of S604 (S3101), and confirms whether the authentication-time operation setting switch 3002 is OFF (not permitted) if the authentication setting switch is ON (S3102). If both S3101 and S3102 are Yes, the MFP 101 ends the process as it is (S606). If any one of S3101 and S3102 is No, the MFP 101 proceeds to S2701, and continues the processes of the first embodiment and the second embodiment as described above.

Fourth Embodiment

Figure 41:
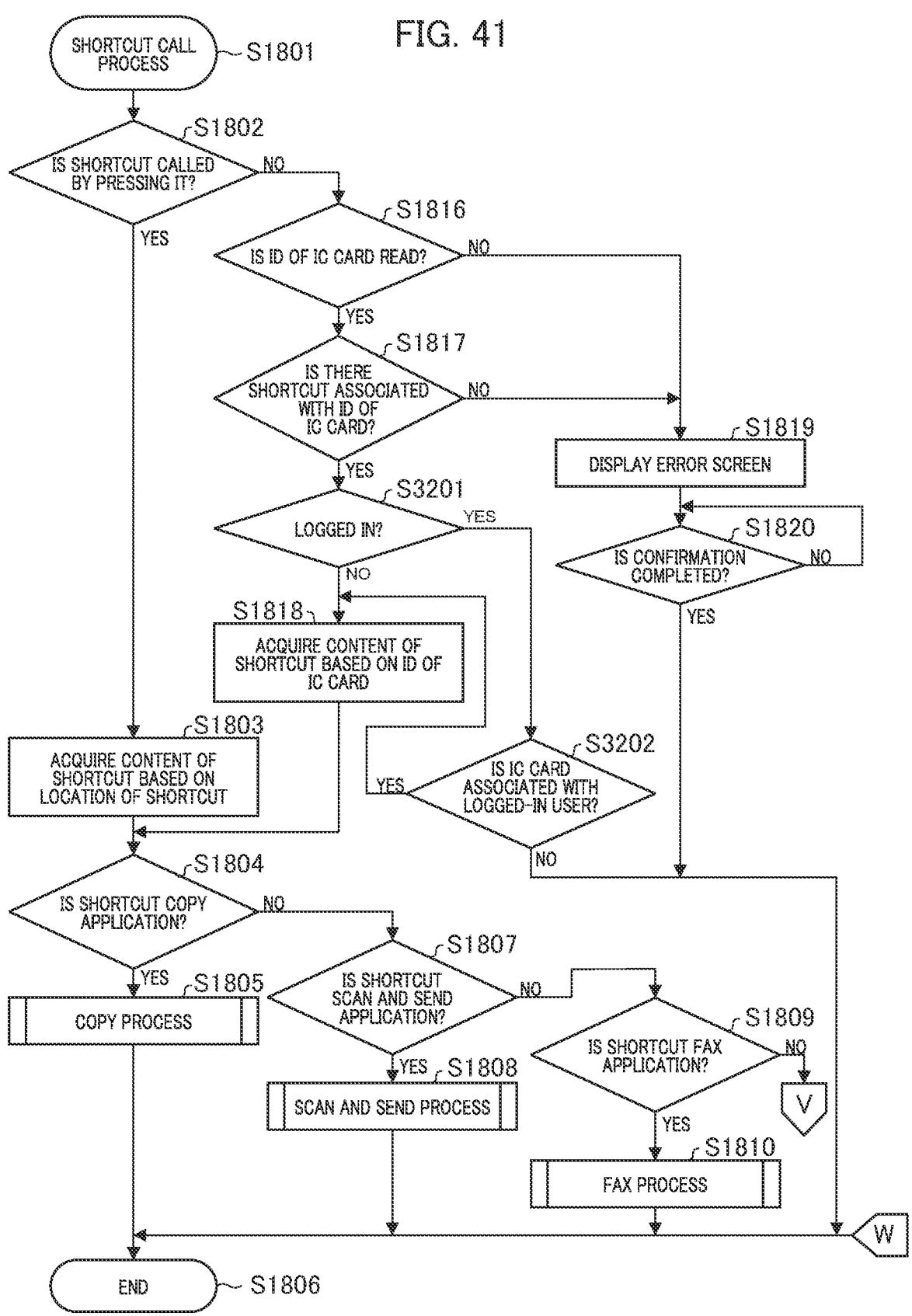
FIG. 41 is a flowchart illustrating an example of a shortcut call process in a fourth embodiment.
Figure 42:
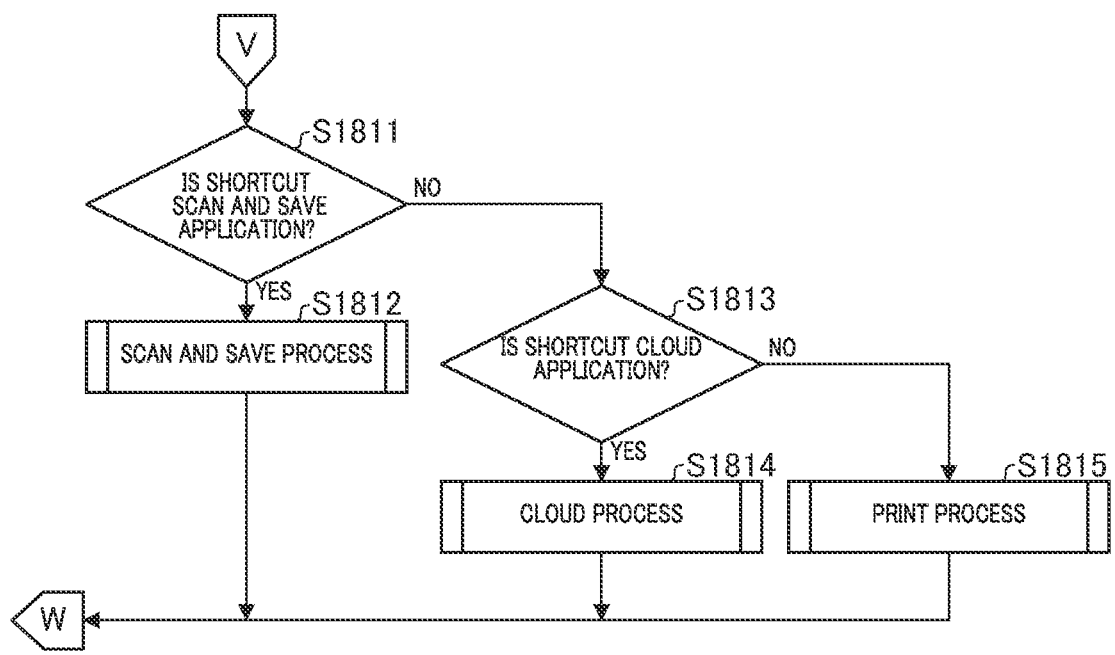
FIG. 42 is a flowchart illustrating an example of the shortcut call process in the fourth embodiment.

A fourth embodiment is an embodiment in which the shortcut call process in the first embodiment is replaced with the processes of the flowcharts of FIGS. 41 and 42. In the flowcharts of FIGS. 41 and 42, the same processes as those in the flowcharts of FIGS. 20 and 21 are denoted by the same reference numerals and signs, and thus the description thereof will not be given. In the flowcharts of FIGS. 41 and 42, the processes of S3201 and S3202 are added to the shortcut call process of FIGS. 20 and 21.

The MFP 101 confirms that there is a shortcut which is associated with the IC card touched in S1817, and then confirms that a user is not logged in to the MFP 101 (S3201). If no one is logged in in S3201, the MFP 101 proceeds to S1818 in the same manner as in the first embodiment. If someone is logged in in S3201, the MFP 101 confirms that the ID of the IC card read in S1816 is associated with the logged-in user account (S3202). If the ID is associated with the logged-in user in S3202, the MFP 101 proceeds to S1818 in the same manner as in the first embodiment. This process is an example of displaying, if a shortcut is called, a screen for a function associated with the shortcut on a display in a state in which a setting value group corresponding to the shortcut is applied. The MFP 101 ends the process if the ID is associated with a separate user from the logged-in user in S3202 or if it is not associated with any user (S1806).

Fifth Embodiment

The MFP 101 may have a mode in which a shortcut is not able to be called with the ID of the IC card used in the login process. The MFP 101 can validate or invalidate this mode. If this mode is invalid, the MFP 101 calls a shortcut by reading the ID of the IC card used in the login process. In addition, the MFP 101 may prohibit the ID of the IC card from being registered and updated in association with a shortcut during login if this mode is valid.

Sixth Embodiment

The MFP 101 performs screen display if a shortcut is called with the ID of the IC card used in the login process and immediate execution is not possible. The MFP 101 displays a screen for setting parameters of the "print application" if immediate execution is not possible, for example, in a case where print is executed by calling a shortcut of the "print application."

Hereinbefore, although the preferred embodiments of the present invention have been described, the present invention is not limited to these embodiments, and can be modified and changed within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-090061, filed May 22, 2020, which is hereby incorporated by reference wherein in its entirety.

What is claimed is:

1. An image processing apparatus which includes a display, is able to read card information from a card, and provides at least any of a function using a scanner and a function using a printer, the image processing apparatus comprising:
   a card detection device;
   a memory storing instructions; and
   a processor executing the instructions causing the image processing apparatus to:
      manage, in a case where first card information is available for a login process, whether or not a mode for preventing a shortcut from being called with the first card information used in the login process is invalid;
      execute, if the first card information associated with a user account is detected, a login process to the image processing apparatus based on the user account;
      register, during a login state according to the login process, a shortcut in association with the first card information used in the login process if the mode is managed as invalid;
      call, in a case where, during the mode managed as invalid, an operation of continuously bringing the card having the first card information close to the card detection device or an operation of keeping the card having the first card information in contact with the card detection device is performed for a certain period of time, the shortcut corresponding to the first card information is called in the login state; and
      display, if the shortcut is called using the first card information, a screen for a function associated with the shortcut on the display in a state in which a setting value group corresponding to the shortcut is applied;
      register another shortcut in association with second card information which is not associated with any user account;
      if the second card information is detected with the card detection device outside of the login state, call another shortcut corresponding to the second card information without the login process.

2. The image processing apparatus according to claim 1, wherein the instructions cause the image processing apparatus to prohibit the first card information from being registered and updated in association with the shortcut during the login state if the mode is valid.

3. The image processing apparatus according to claim 1, wherein the instructions cause the image processing apparatus to perform screen display if the shortcut is called with the first card information used in the login process and immediate execution is not possible.

4. A method for controlling an image processing apparatus which includes a display, is able to read card information from a card, and provides at least any of a function using a scanner and a function using a printer, the method comprising:
   managing, in a case where first card information is available for a login process, whether or not a mode for preventing a shortcut from being called with the first card information used in the login process is invalid;
   executing, if the first card information associated with a user account is detected, a login process to the image processing apparatus based on the user account;
   registering, during a login state according to the login process, a shortcut in association with the first card information used in the login process if the mode is managed as invalid;
   calling, in a case where, during the mode managed as invalid, an operation of continuously bringing the card having the first card information close to a card detection device or an operation of keeping the card having the first card information in contact with the card detection device is performed for a certain period of time, the shortcut corresponding to the first card information is called in the login state; and
   displaying, if the shortcut is called using the first card information, a screen for a function associated with the shortcut on the display in a state in which a setting value group corresponding to the shortcut is applied;
   registering another shortcut in association with second card information which is not associated with any user account;
   if the second card information is detected with the card detection device outside of the login state, calling another shortcut corresponding to the second card information without the login process.

5. The method according to claim 4, wherein the first card information is prohibited from being registered and updated in association with the shortcut during the login state if the mode is valid.

6. The method according to claim 4, wherein screen display is performed if the shortcut is called with the first card information used in the login process and immediate execution is not possible.

7. A non-transitory storage medium storing a computer program including instructions, which when executed by one or more processors of an image processing apparatus which includes a display, is able to read card information from a card, and provides at least any of a function using a scanner and a function using a printer, cause the image processing apparatus to perform operations comprising:
   managing, in a case where first card information is available for a login process, whether or not a mode for preventing a shortcut from being called with the first card information used in the login process is invalid;
   executing, if the first card information associated with a user account is detected, a login process to the image processing apparatus based on the user account;
   registering, during a login state according to the login process, a shortcut in association with the first card information used in the login process if the mode is managed as invalid;

calling, in a case where, during the mode managed as invalid, an operation of continuously bringing the card having the first card information close to a card detection device or an operation of keeping the card having the first card information in contact with the card detection device is performed for a certain period of time, the shortcut corresponding to the first card information is called in the login state; and displaying, if the shortcut is called using the first card information, a screen for a function associated with the shortcut on the display in a state in which a setting value group corresponding to the shortcut is applied;

registering another shortcut in association with second card information which is not associated with any user account;

if the second card information is detected with the card detection device outside of the login state, calling another shortcut corresponding to the second card information without the login process.

\* \* \* \* \*